(12) United States Patent
Mandal et al.

(10) Patent No.: US 12,130,739 B2
(45) Date of Patent: Oct. 29, 2024

(54) APPARATUSES, METHODS, AND SYSTEMS FOR DYNAMIC BYPASSING OF LAST LEVEL CACHE

(71) Applicant: Intel Corporation, Santa Clara, CA (US)

(72) Inventors: Ayan Mandal, Bangaluru (IN); Neetu Jindal, Kurukshetra (IN); Leon Polishuk, Haifa (IL); Yossi Grotas, Holon (IL); Aravindh Anantaraman, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 942 days.

(21) Appl. No.: 16/833,304

(22) Filed: Mar. 27, 2020

(65) Prior Publication Data

US 2021/0303467 A1    Sep. 30, 2021

(51) Int. Cl.
*G06F 12/00* (2006.01)
*G06F 12/0811* (2016.01)
*G06F 12/0831* (2016.01)
*G06F 12/123* (2016.01)

(52) U.S. Cl.
CPC ...... *G06F 12/0811* (2013.01); *G06F 12/0831* (2013.01); *G06F 12/123* (2013.01); *G06F 2212/1021* (2013.01)

(58) Field of Classification Search
CPC ............. G06F 12/0811; G06F 12/0831; G06F 12/123; G06F 2212/1021; G06F 12/0888; Y02D 10/00
See application file for complete search history.

(56) References Cited

U.S. PATENT DOCUMENTS

| 2012/0254550 | A1 | 10/2012 | Gaur et al. | |
| 2014/0075125 | A1* | 3/2014 | Biswas | G06F 12/08 711/136 |
| 2016/0026574 | A1 | 1/2016 | Frank et al. | |
| 2019/0013062 | A1 | 1/2019 | Atallah et al. | |
| 2019/0050340 | A1* | 2/2019 | Anderson | G06F 12/0246 |
| 2019/0155750 | A1* | 5/2019 | Wang | G06F 12/126 |

OTHER PUBLICATIONS

European Search Report and Search Opinion, EP App. No. 20212607.4, Jun. 21, 2021, 07 pages.
Kharbutli et al: "Counter-Based Cache Replacement and Bypassing Algorithms", IEEE Transactions On Computers, vol. 57, No. 4, pp. 433-447.
Office Action, EP App. No. 20212607.4, Apr. 17, 2024, 6 pages.

* cited by examiner

*Primary Examiner* — Arvind Talukdar
(74) *Attorney, Agent, or Firm* — NICHOLSON DE VOS WEBSTER & ELLIOTT LLP

(57) ABSTRACT

Systems, methods, and apparatuses relating to circuitry to implement dynamic bypassing of last level cache are described. In one embodiment, a hardware processor includes a cache to store a plurality of cache lines of data, a processing element to generate a memory request and mark the memory request with a reuse hint value, and a cache controller circuit to mark a corresponding cache line in the cache as more recently used when the memory request is a read request that is a hit in the cache and the reuse hint value is a first value, and mark the corresponding cache line in the cache as less recently used when the memory request is the read request that is the hit in the cache and the reuse hint value is a second, different value.

21 Claims, 17 Drawing Sheets

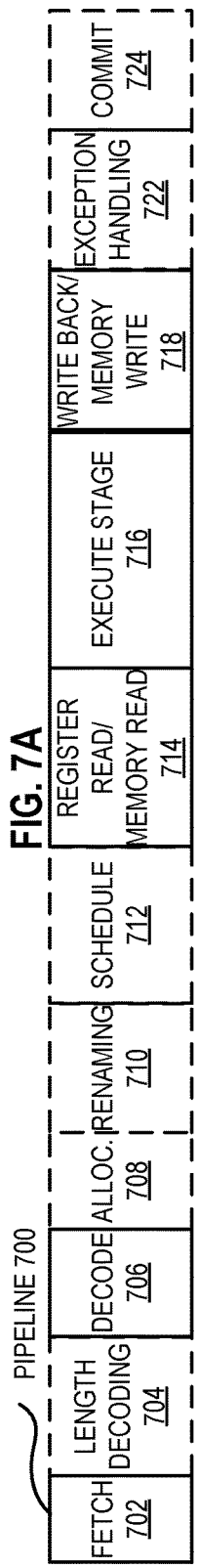
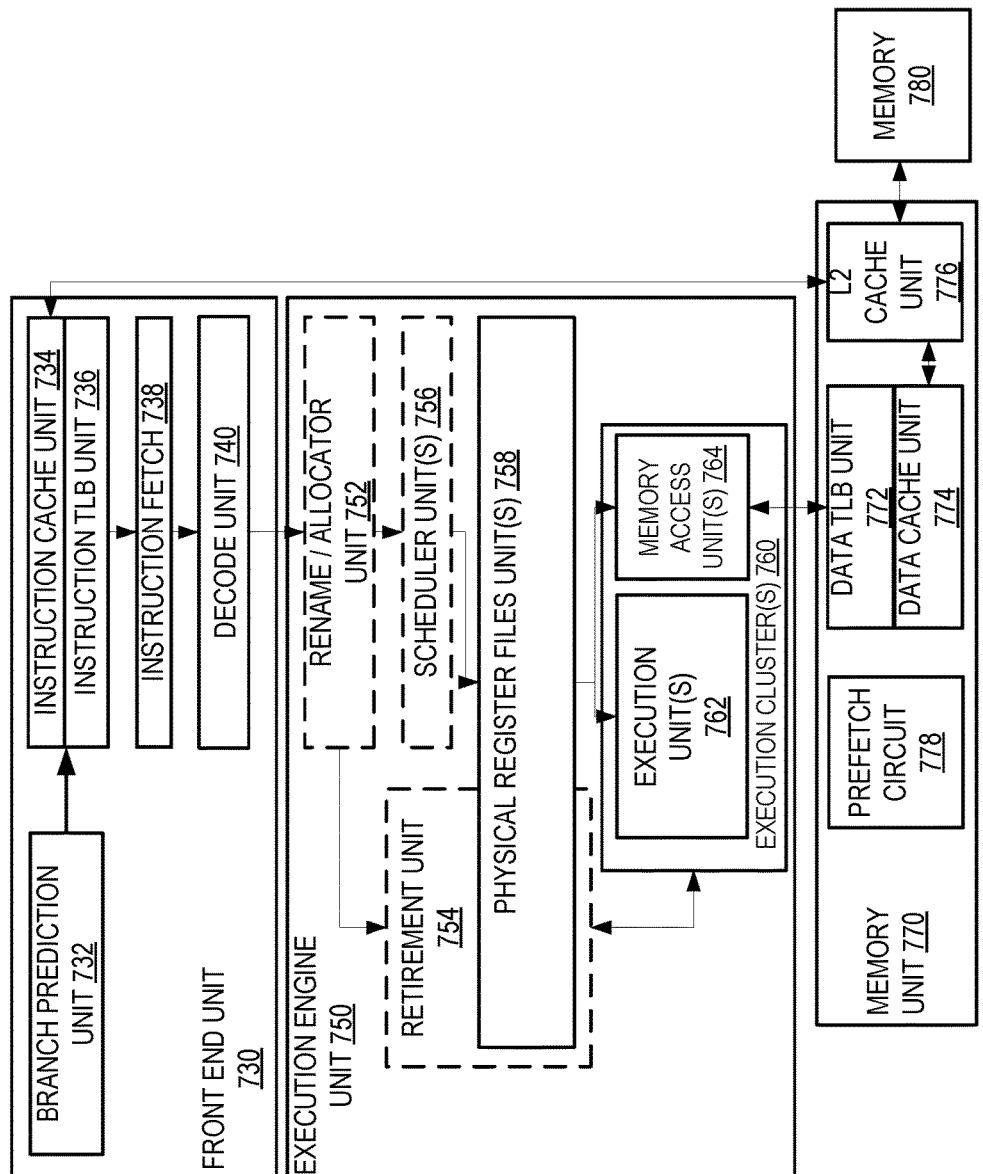

APPARATUSES, METHODS, AND SYSTEMS FOR DYNAMIC BYPASSING OF LAST LEVEL CACHE

TECHNICAL FIELD

The disclosure relates generally to electronics, and, more specifically, an embodiment of the disclosure relates to circuitry to implement dynamic bypassing of last level cache.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 7A is a block diagram illustrating both an exemplary in-order pipeline and an exemplary register renaming, out-of-order issue/execution pipeline according to embodiments of the disclosure.

FIG. 7B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

Figure 1:
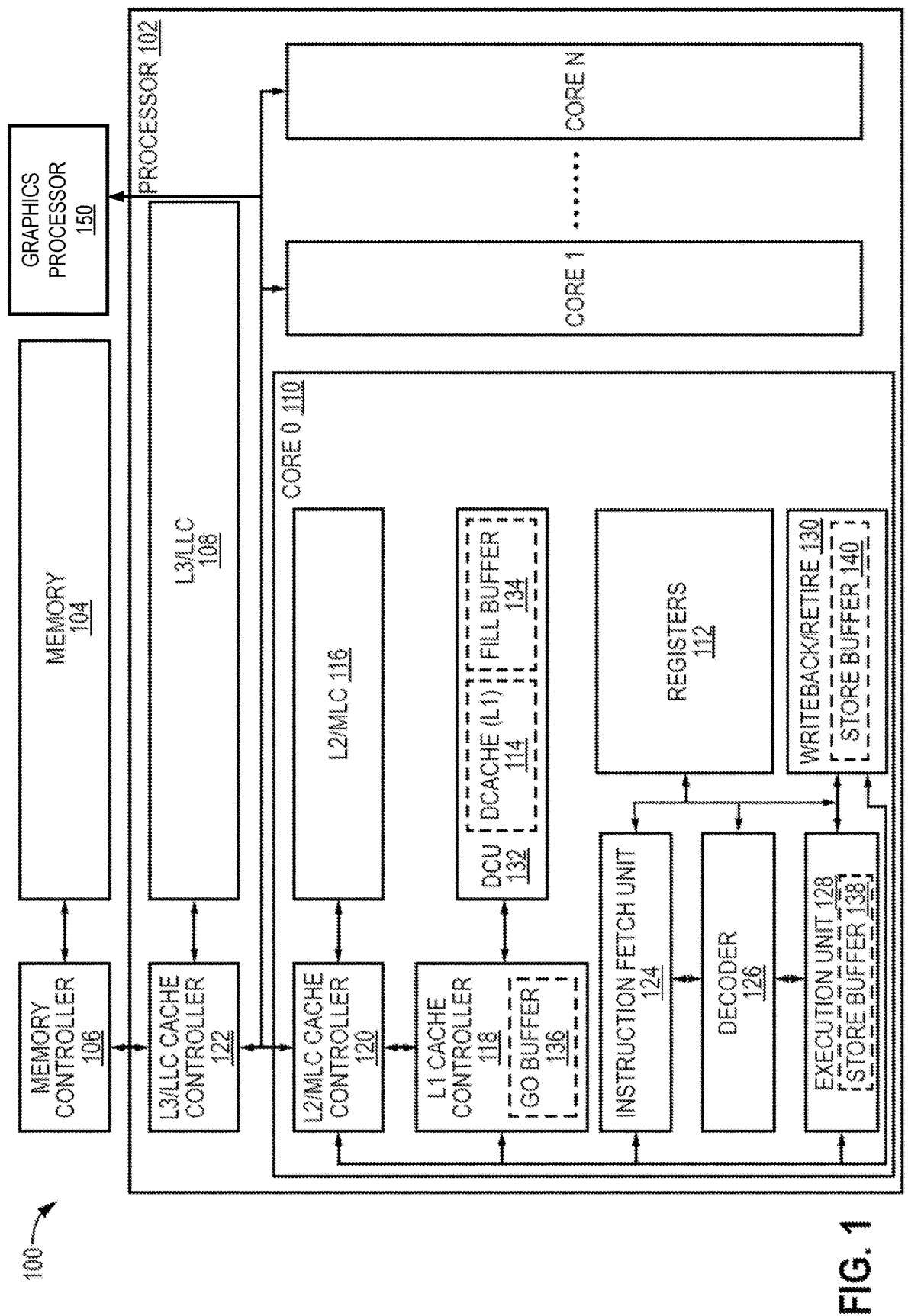
FIG. 1 illustrates a hardware processor coupled to a memory according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor may operate on a cache line, e.g., in performing arithmetic or logic functions. A cache line may generally refer to a block (e.g., a sector) of memory (e.g., a cache) that may be managed as a unit for coherence purposes, for example, via cache tags maintained on a per-line basis, e.g., in a tag directory of a cache controller circuit. A cache line may be stored in cache memory (e.g., of any level, such as, but not limited to, L1, L2, L3, L4, etc.), system memory, or combinations thereof. Cache memory may be shared by multiple cores of a processor or local (e.g., not shared) to each core of a processor. Cache memory (e.g., a cache) may generally refer to a memory buffer inserted between one or more processors and other memory, for example, to store (e.g., hold) currently active copies of cache lines (e.g., blocks from system (main) memory). Cache memory may be local to each processor. Additionally, or alternatively, cache memory may be shared by multiple processors, e.g., separate from each processor. System memory may be separate from any cache memory, e.g., system memory that is off-die relative to a processor core. Processing elements that use (e.g., share) a cache may be processor cores of a data processor and/or graphic processors. Cache line may refer to a 64-byte sized section of memory, e.g., 64 byte granularity.

Cache line coherency may generally refer to each cache (e.g., cache memory) and/or system (e.g., main) memory in the coherence domain observing all modifications of that same cache line (e.g., that each instance of that cache line contains the same data). For example, a modification may be said to be observed by a cache when any subsequent read would return the newly (e.g., current) written value.

In one embodiment, cache line coherency logic (e.g., as part of a hardware apparatus or method) may be used to manage and/or resolve conflicts resulting from a number of transactions, for example, a cache line look-up, cache line eviction, cache line fill, and snoop transactions. A snoop may generally refer to the action taken by a module on a transaction when it is not the master that originated the transaction or the repository of last resort for the data, but it still monitors the transaction. A cache (e.g., cache memory) and/or system memory may be snooped to maintain coherence during transactions to a cache line appearing in multiple locations in the cache and/or system memory.

In one embodiment, a cache line look-up may involve read and/or read-for-ownership transactions from the processor cores accessing the cache and/or system memory to read or gain ownership of a desired cache line. If the cache line look-up results in a miss in the cache (e.g., cache local to a processor), the request may be allocated to the external request queue, e.g., corresponding to an interface with the system memory. If the cache line look-up results in a hit (e.g., and the corresponding cache line is not exclusively owned by another core or processor), then the request may be completed and the cache line (e.g., data) returned to the requesting core (e.g., and/or to the core that exclusively owns the cache line). Accesses to a particular core from a requesting agent may be reduced by maintaining a tag (e.g., record) in a tag directory of whether another core has exclusive ownership, shared ownership, or no ownership of a requested line of the cache. The tag may be sets of bits in a tag directory (e.g., register) corresponding to the number of cores in a processor and/or processors, where each set of bits may indicate the type of ownership of the requested cache line, if any, for the core and/or processor to which it corresponds. However, the tag may be implemented in other ways without departing from the spirit of this disclosure.

In certain embodiments, a component of a system (e.g., a graphics processor) is to first search into a cache for a memory access (e.g., a read access to cause a read of data or a write access to cause a write of (e.g., payload) data) before performing a more time consuming access into memory (e.g., system memory) separate from the cache.

In some embodiments, the working dataset set of (e.g., graphics processing) applications is (e.g., much) larger than the capacity of a cache (e.g., a last level cache (LLC) before memory) in a system (e.g., system on a chip) results in a significant thrashing of the data written into the cache with minimal reuse of that data in the LLC. In a power constrained system, this inefficiency leads to more power consumption due to additional reads and writes into the cache (e.g., LLC) which does not provide any reuse. Certain embodiments herein provide a dynamic bypass of a cache (e.g., LLC), e.g., without bypassing the cache for a particular application (e.g., a graphics processing workload) and/or without enlarging the capacity of the cache (e.g., LLC). Embodiments herein provide circuitry for dynamic bypassing of cache that improves the efficiency of the cache usage for graphics processing applications with large working sets of data. Embodiments herein of dynamic cache bypassing identifies and bypasses any additional footprint which would have been thrashed (e.g., written back to main (e.g., system) memory without getting used by a read from the requestor), and thus helps in saving significant cache (e.g., LLC) power and improves the cache (e.g., LLC) read hit rate by preventing thrashing. Embodiments of dynamic cache bypassing provide better write locality in memory (e.g., dynamic random-access memory (DRAM)) pages for the bypassed writes. Embodiments of dynamic cache bypassing are agnostic to the cache (e.g., LLC) capacity and the workload working set, and adapts to various cache (e.g., LLC) sizes in different SoCs and different workloads with different working sets. Embodiments of dynamic cache bypassing identify and bypass certain data which would have been thrashed directly to main memory thereby saving significant power. Embodiments of dynamic cache bypassing improve the read hit rate by reducing the thrashing in the cache (e.g., LLC) and thereby saving memory power and providing better latency and bandwidth to the system as compared to baseline. Embodiments of dynamic cache bypassing provides improved memory page locality of the writes bypassed to that memory which in baseline is re-ordered in the cache (e.g., LLC) caching and subsequent eviction. In certain embodiments of dynamic cache bypassing, only those cache lines that are expected to be reused are filled into a cache (e.g., LLC).

In one embodiment, a micro-kernel has two independent threads which are operating simultaneously. For example, with the first thread writing a buffer allocated in the (e.g., main) memory and the second thread reading the same buffer from the (e.g., main) memory. In this example, the difference between the write pointer (e.g., where the first thread writes) and the read pointer (e.g., where the second thread reads) is larger than the capacity of the cache (e.g., LLC). Without using dynamic cache bypassing, this micro-kernel will show the amount of reads to the main memory to be identical to the buffer size and the cache (e.g., LLC) will not be able to provide any reuse from the writes done by the first thread in one embodiment. With an embodiment of dynamic cache bypassing enabled, the reads going to the (e.g., main) memory will be significantly less than the size of the buffer that was read.

A graphics processor may include an integrated graphics pipeline that employs multiple render target write and dynamic texture pipeline passes. While the intra-pass locality may be captured within the local graphics caches through various tiling techniques, the inter-pass locality between the dynamic texture reads and the render target writes is hard to capture in certain embodiments because of the large data footprints. Caching this traffic in a (e.g., shared) cache (e.g., LLC) allows a proper subset of this locality to be captured. However, where these footprints are much larger than the cache (e.g., LLC) size, most of the cached writes get thrashed and evicted without any further reuse in certain embodiments. Selectively caching a portion of the footprint that fits in the cache (e.g., the LLC) and bypassing the rest may result in significant power savings in the cache by preventing useless writes to the cache (e.g., LLC) (e.g., data array). However, in certain embodiments, such a scheme is to know the workload footprint as well as the cache (e.g., LLC) size. Certain embodiments herein provide for a dynamic cache bypassing that is agnostic of the cache (e.g., LLC) size and the workload footprint, for example, by identifying and bypassing any additional footprint which would have been thrashed, e.g., resulting in saving of cache (e.g., LLC) power.

In one embodiment, eviction of data from a cache (e.g., LLC) for new data is based on the age of each item of data (e.g., each cache line of data). One policy for evicting data is a least recently used (LRU) policy, for example, where the least recently used element(s) are discarded first, e.g., as indicated by age bits maintained for each element. However, in some embodiments, the cache (e.g., LLC) eviction is done according due to a LRU policy, so the order of eviction from the cache (e.g., LLC) is different from the order of writes that a processing element (e.g., a graphics processor) sends.

In one embodiment, a processing element (e.g., a graphics processor) sends streaming writes, where caching their data into the cache (e.g., LLC) re-orders them, and what is observed in memory appears to be a random stream of writes. Memory (e.g., DRAM) efficiency may be higher for a sequential stream compared to the random streams where a random stream adds the overhead of opening and closing memory (e.g., DRAM) pages with less accesses per page. Embodiments of dynamic cache bypassing provide better write locality in memory (e.g., DRAM) pages for bypassed writes by maintaining the locality of the streaming writes from the processing element (e.g., graphics processor).

In certain embodiments, filling a cache line in a non-inclusive cache (e.g., an L3 LLC where data in a numerically lower-level cache (e.g., L1 and/or L2 cache) may or not be in the LLC) is only useful when that line is going to be reused, e.g., otherwise the operation of unnecessarily filling a line in the cache wastes power and may replace an existing line that is potentially more useful. Embodiments of dynamic cache bypassing identify such a scenario and bypasses the additional write(s) which would have been otherwise thrashed from the cache (e.g., LLC) without any reuse (e.g., using a particular cache line from the cache multiple times before evicting it from the cache).

Turning now to FIG. 1, an example core architecture is depicted. FIG. 1 illustrates a hardware processor 102 coupled to a memory 104 according to embodiments of the disclosure. In one embodiment, the memory 104 of system 100 is a system memory (e.g., dynamic random-access memory (DRAM)). Memory controller 106 may be included, e.g., to manage memory requests between the processor 102 and memory 104. Memory controller 106 may include first memory controller circuitry for a first level of memory and second memory controller circuitry for a second, different level of memory. In one embodiment, memory controller 106 is to provide (e.g., fill) data (e.g., a cache line) for a miss in the cache(s) (e.g., miss in L3 or other last level cache (LLC) 108 of processor 102). Processor 102 may include one or more processor cores, e.g., 0 to N where N is a positive integer. Each core may have a direct communication path from one core to another. In one embodiment, each of a plurality of processor cores have an instance of the circuitry, etc. depicted and/or discussed in reference to core 110 in FIG. 1. A graphics processor 150 (e.g., any of the graphics processing components discussed herein) may also share use of the L3 or other last level cache (LLC) 108 of processor 102. Graphics processor 150 and processor 102 may be in a single SoC together.

Depicted core 110 includes a set of registers 112, a first level cache (level one (L1)) 114 (e.g., data cache (Dcache), and a level two (L2) or mid-level cache (MLC) 116. In some embodiments, as shown in FIG. 1, a processor 102 includes a next level (e.g., level three (L3) cache or last level cache (LLC) 108 (e.g., the last cache searched before a data item is fetched from memory 104) that is coupled to, and shared by, one or more (e.g., all) of the cores. In certain embodiments, each of L1 114, L2/MLC 116, and L3/LLC 108 caches are managed by a respective cache controller (188, 120, 122, respectively) (e.g., cache controller circuitry) to cache data (e.g., and/or instructions) according to a specified cache coherency, e.g., as discussed above. In certain embodiments, the instructions and data stored within the various processor caches are managed at the granularity of cache lines which may be a fixed size (e.g., 64, 128, 512, etc. Bytes in length). Core 110 further includes an instruction fetch unit 124 for fetching instructions (for example, from (e.g., main) memory 104 via memory controller 106 and/or from the shared LLC 108 via L3/LLC cache controller 122); a decoder 126 (e.g., decode circuit or decode unit) for decoding the instructions (e.g., decoding program instructions into micro-operations or "pops"); an execution unit 128 (e.g., execution circuit) for executing the decoded instructions; and a writeback/retire unit 130 (e.g., writeback/ retire circuit) for retiring the instructions and writing back the results. Although separate cache controllers for each layer are depicted, it should be understood that a single cache controller that controls a plurality of (e.g., all) cache layers (e.g., and other components utilizing cache coherency) may be utilized. In certain embodiments, a core is an instance of core 790 in FIG. 7B.

Depicted core 110 in FIG. 1 includes a data cache unit 132. Data cache unit 132 may include a data (e.g., L1) cache 114 and/or fill buffer 134. In certain embodiments, the data cache unit 132 is to receive a request to perform a memory access (e.g., a store or load), for example, from execution unit 128 and/or writeback/retire unit 130. As one example, a processor (e.g., via execution of an instruction) may have a plurality of storage requests (e.g., to store a resultant of an operation(s) by instructions). A store buffer may be included. In one embodiment, execution unit 128 includes optional store buffer 138. In one embodiment, writeback/retirement unit 130 includes optional store buffer 140. In one embodiment, a store buffer (e.g., either of store buffer 138 or store buffer 140) maintains (e.g., serializes) stores (e.g., storage requests which may also include the payload to be stored at a target cache line) in (e.g., program) order (and not the order of execution, which may be out-of-order) to ensure in (e.g., program) order updates to the memory (e.g., caches). In certain embodiments, a processor is placed in total store order (TSO) mode to enable use of the store buffer(s), etc. Store buffer may be a first in, first out buffer (FIFO), e.g., with the stores provided to the FIFO buffer in program order.

In certain embodiments, a store (e.g., store request) is sent from the generating component (e.g., execution unit) to a memory component (e.g., cache controller) to perform the store operation. In one embodiment, stores are sent to data cache unit 132, for example, to data cache (L1) 114 to check if there is a hit for the store. In one embodiment, a store request includes an identifier of a location (e.g., an address) to perform the store operation. In certain embodiments, a hit occurs for a cache when it is determined that the cache includes a copy of the data for the location.

In certain embodiments, a store request is sent to the data cache (DCache) 114, and if there is a miss (e.g., not a hit), then that store request is sent to fill buffer 134 for servicing. Fill buffer 134 (e.g., or a miss status handling register (MSHR)) may have one of its plurality of entries assigned to the missed store request, and a process of obtaining access to be able to write the data to the store location is begun. In one embodiment, a request for ownership (RFO) is sent (e.g., from the fill buffer) into the memory subsystem (e.g., to a cache that currently has write access for the location the data is to be stored to) and a confirmation response is sent back when the storage location for the miss is allowed to be written to. A confirmation response may be a confirmation value that indicates the cache 114 now has ownership over the other location (e.g., other cache) that does store data for the location, and the store request may now be serviced (e.g., by writing that data to a cache line in data cache 114 and propagating that data to any other caches that have instances of that cache line). Processor 102 may also include a globally observable (GO) buffer 136, which is depicted as being in the L1 cache controller 118. GO buffer 136 may be provided to keep track of the program order for the misses (e.g., store requests that did not hit in the data cache being targeted). In one embodiment, the information from the GO buffer 136 is then used to cause (e.g., guarantee) store updates to the targeted cache (e.g., cache 114) in program order. In certain embodiments, a "globally observable buffer" stores (e.g., in program order) data (e.g., storage requests) that is waiting to be made architecturally visible to all components sharing a memory subsystem, e.g., a globally observable store buffer (GoSB) for stores that are waiting to be made architecturally visible. In certain embodiments, a "globally observable buffer" stores (e.g., in program order) a list of all outstanding stores that wait for their "request for ownership" response (e.g., a response that indicates ownership that allows a store of data to a corresponding cache line).

System 100 (e.g., one or more of cache controllers 188, 120, and 122) may include dynamic cache bypass functionality as discussed herein. For example, L3/LLC cache controller 122 may include dynamic cache bypass functionality to selectively control fills and/or bypasses of LLC 108. In one embodiment, a core (e.g., core 110) accesses LLC 108, e.g., via cache controller 122. In one embodiment, graphics processor 150 accesses LLC 108, e.g., via cache controller 122. As an example, a component (for example, core or other processing element, e.g., of processor 102 and/or graphics processor 150) generates a memory request (e.g., a request to load or store data) and the LLC 108 is the last cache checked before accessing the memory 104 for the memory request. The memory request may first be attempted to be serviced by of L1 cache 114 and/or L2 cache (e.g., and any other caches before LLC 108 in the hierarchy), and a miss in that cache(s) is then attempted to be serviced by LLC 108.

In one embodiment, a (e.g., LLC) cache and core(s) are on the same interconnect, e.g., a ring interconnect. In one embodiment, a cache (e.g., LLC) (e.g., L3 108), core(s), and graphics processor (e.g., graphics processor 150) are on the same interconnect, e.g., a ring interconnect.

In certain embodiments, the data (e.g., cache line of data) stored in each entry in a cache is replaced based upon when it was recently used. For example, a single or multiple bit usage value (e.g., age) may be included for each cache line to track which cache line(s) are the most recently used versus those that are least recently used. The usage value may be a multiple bit value (e.g., 2 bits offering four different ages from most recently used, next most recently used, second next most recently used, to least recently used) updated on each access to the cache line (e.g., a hit or a fill of that cache line).

A memory request may be a read request (for example, a request to load a particular cache line, e.g., as identified by its address) or a write request (for example, a request to store provided data (e.g., resultant data from an operation by a processing element) at a particular cache line, e.g., as identified by its address). Embodiments of dynamic cache bypassing may utilize (e.g., in contrast to a baseline policy where writes are always filled in the LLC at a "most recently used" status) a policy where read hits are promoted to "most recently used" status and/or read misses are installed at "most recently used" status if the reuse hint value is set (e.g., cache near is set to 1) and else they are bypassed. Embodiments of dynamic cache bypassing may utilize the flows discussed in FIG. 2 and/or FIG. 3 below.

Figure 2:
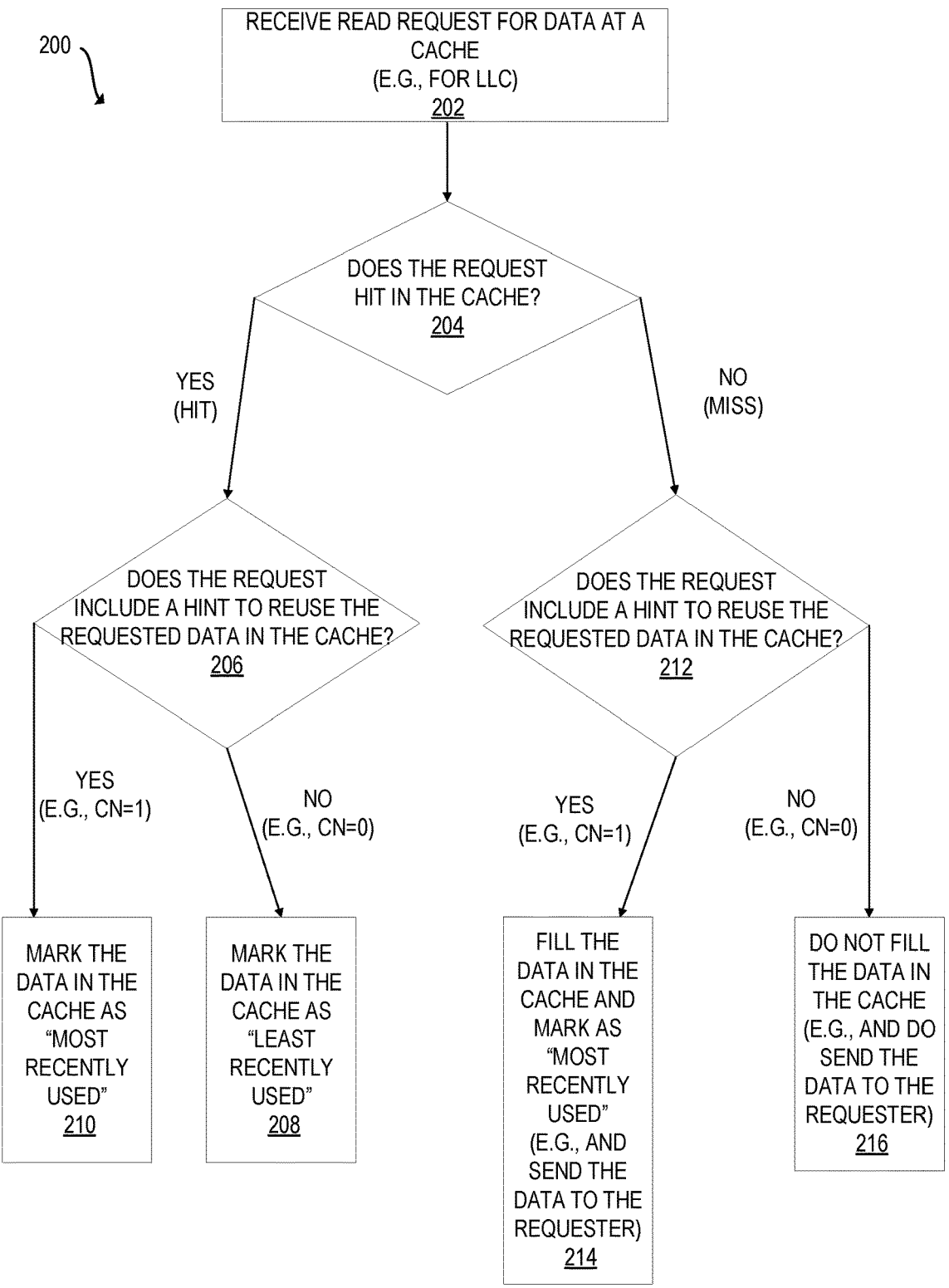
FIG. 2 illustrates an example flow for a dynamic cache bypass for a read request for data according to embodiments of the disclosure.

FIG. 2 illustrates an example flow 200 for a dynamic cache bypass for a read request for data according to embodiments of the disclosure. Depicted flow 200 shows how a read request (e.g., from a processing element) is handled at a cache (e.g., the LLC) according to embodiments of dynamic cache bypassing. In certain embodiments, two parameters are used to determine whether and how to fill the requested data (e.g., cache line). The first parameter is if the cache line already exists (e.g., is a hit) in the cache (e.g., LLC). The second parameter is a reuse hint value (which may be referred to as a cache near (CN) value) which is specified by the processing element (e.g., as a field included with the memory request) that indicates whether it is desired that a particular cache line will be reused from the cache (e.g., LLC). In certain embodiments, the processing element will (e.g., usually) set the reuse hint value (e.g., CN value) for a cache line to a first value (e.g., zero or false) to indicate reuse is to be minimized and/or set the reuse hint value (e.g., CN) value) for the cache line to a second value (e.g., one or true) to indicate reuse is to be maximized. In one embodiment, the reuse hint value is selected for each cache line, for each stream, or for each thread by the code that, when executing, causes generation of the memory requests (e.g., the reuse hint value(s) selected by a driver of the code). In certain embodiments, the reuse hint value is set to the second value (e.g., true value to indicate reuse is to be maximized for that cache line) only for some control surfaces (e.g., translation lookaside buffer (TLB) translations), e.g., which are very small in terms of the overall capacity. In certain embodiments, these two parameters result in four possible scenarios:

(i) Hit, reuse hint value=1: The usage value (e.g., age) (e.g., LRU bits) of the cache line is modified to make the line the most recently used in the cache set.

(ii) Hit, reuse hint value=0: The usage value (e.g., age) (e.g., LRU bits) is modified so that the cache line becomes the least recently used in the cache set.

(iii) Miss, reuse hint value=1: The cache line is filled in the cache (e.g., LLC) as the most recently used line in its usage value (e.g., age) (e.g., LRU bits).

(iv) Miss, reuse hint value=0: The cache line is fetched from memory and is not filled in the cache (e.g., LLC), for example, the line bypasses the cache.

In certain embodiments, when a read request (e.g., with a reuse hint value=0) hits in the cache (e.g., LLC) the usage value (e.g., age) (e.g., LRU bits) of the cache line is modified to the least recently used value. As discussed below in reference to FIGS. 3 and 4, this may cause a usage value for a set of the cache including that cache line (e.g., a counter implementing usage values for each set of the cache(s) 410 in FIG. 4) to be changed and hence create opportunity for newer writes to be cached into the LLC (e.g., as discussed below in reference to FIG. 3).

In certain embodiments, a usage value (e.g., age) may be selectable between a least recently used (LRU) value to a most recently used (MRU) value, e.g., with more recently used and less recently used values therebetween.

In certain embodiments, a single cache (e.g., LLC) includes a plurality of sets (e.g., where each set has a plurality of ways) therein.

Depicted flow 200 includes receiving a read request for data (e.g., cache line) at a cache (e.g., for LLC) at 202, checking if the request hit in the cache at 204, and if yes, checking if the request includes a hint to reuse (e.g., reuse hint value CN=1) the requested data in the cache at 206, and if yes at 206, then marking the data (e.g., cache line) in the cache as the most recently used (e.g., in that way) at 210, and if no at 206 (e.g., reuse hint value CN=0), then marking the data (e.g., cache line) in the cache as the least recently used at 208 (e.g., reversing the aging that one might expect for a hit), and if the request did not hit (e.g., a miss) at 204, checking if the request includes a hint to reuse (e.g., reuse hint value CN=1) the requested data in the cache at 212, and if yes at 212, then filling the data (e.g., cache line) in the cache, marking that filled data as the most recently used, and/or sending the data to the requestor (e.g., processing element or other level of cache) at 214, and if no at 212, then not filling the data (e.g., cache line) in the cache (e.g., and sending the data directly to the requestor or to another cache of the requestor without storing the data into the cache (e.g., LLC)) at 216.

Figure 3:
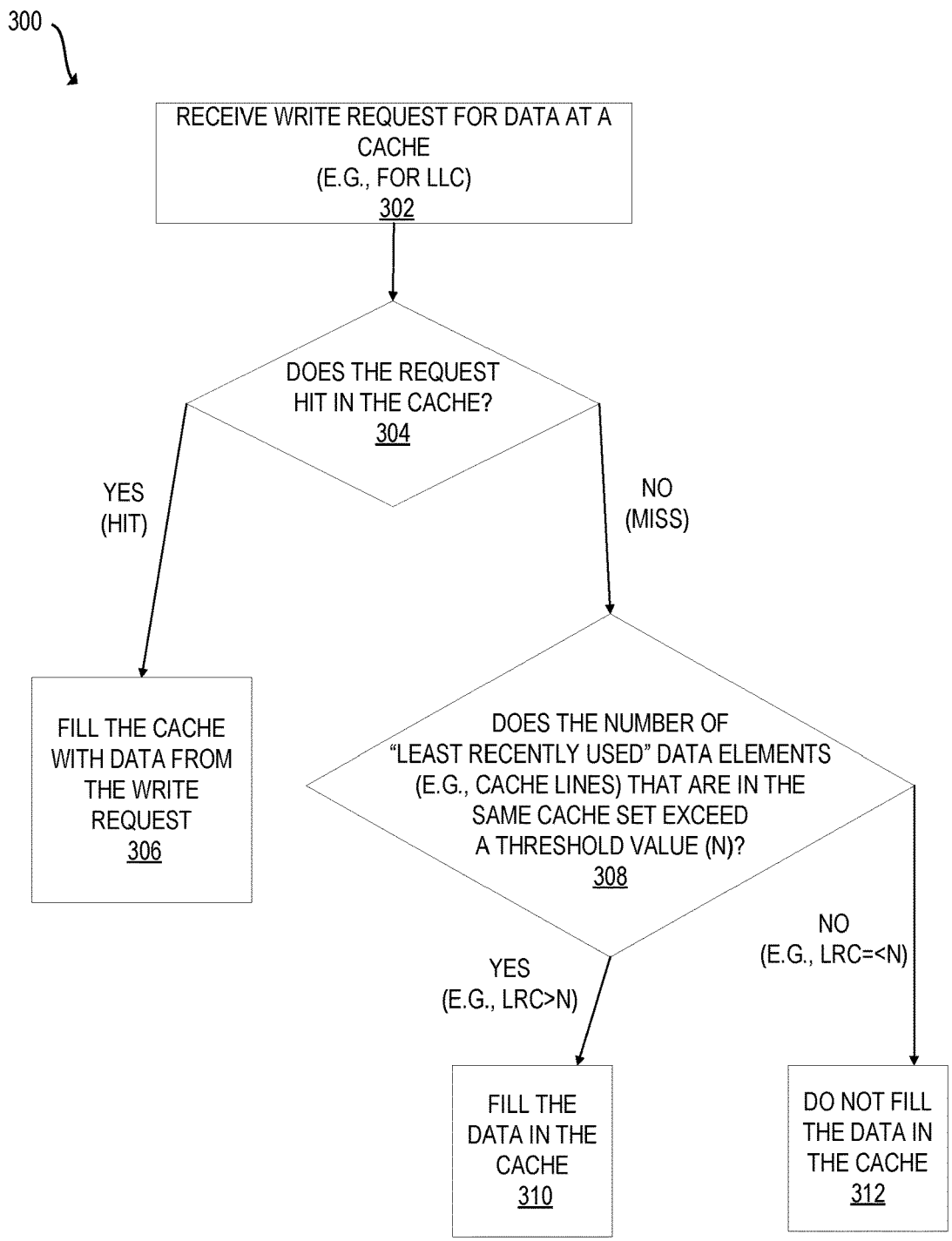
FIG. 3 illustrates an example flow for a dynamic cache bypass for a write request for data according to embodiments of the disclosure.

FIG. 3 illustrates an example flow 300 for a dynamic cache bypass for a write request for data according to embodiments of the disclosure. Depicted flow 300 shows how a write request (e.g., from a processing element) is handled at a cache (e.g., the LLC) according to embodiments of dynamic cache bypassing. In certain embodiments, if the request hits in the cache (e.g., LLC), then the cache line is simply written into the cache (e.g., LLC), for example, because this write back request by itself indicates reusability and it does not cause an LLC eviction. In certain embodiments, otherwise, if the request misses in the cache (e.g., LLC) (which is a common case in embodiments), then the decision whether to fill the line in cache (e.g., LLC) depends on the number of least recently used lines, for example, (i) that are present in the same cache set, which may be tracked in a least-recently-used counter (LRC) (e.g., 410 in FIG. 4), (ii) that are present in a previous cache set, or (iii) for an average of all recent N number of accesses (where N is any positive integer). In one embodiment, the cache line is filled in the cache (e.g., LLC) only if the LRC is larger than a threshold (e.g., 408 in FIG. 4). Thus, in certain embodiments, LRC is an indicator to show how much data has been written to the cache (e.g., LLC) without getting used, for example, with a low LRC counter indicating that the cache (e.g., LLC) already holds data which is yet to be read by the processing element. At this stage, writing new data to the cache (e.g., LLC) means that the existing data will get thrashed to the main memory without getting used in certain embodiments. So, this may be used as a criterion for bypassing additional writes. In certain embodiments, a write request when filled in cache is always filled and marked as the MRU, e.g., where each such write reduces the LRC count for the set.

Depicted flow 300 includes receiving a write request for data (e.g., cache line) at a cache (e.g., for LLC) at 302, checking if the request hit in the cache at 304, and if yes, filling the cache with data from the write request at 306, and if no at 304, checking if the number of "least recently used" data elements (e.g., cache lines) that are in the same cache set (e.g., way) exceed a threshold value (N) at 308, and if yes at 308, filling the data into the cache at 310, and if no (or equal) at 308, not filling the data into the cache at 312 (for example, bypassing the cache, e.g., so as to not overwrite cache line(s) that have not been read yet from the cache).

Figure 4:
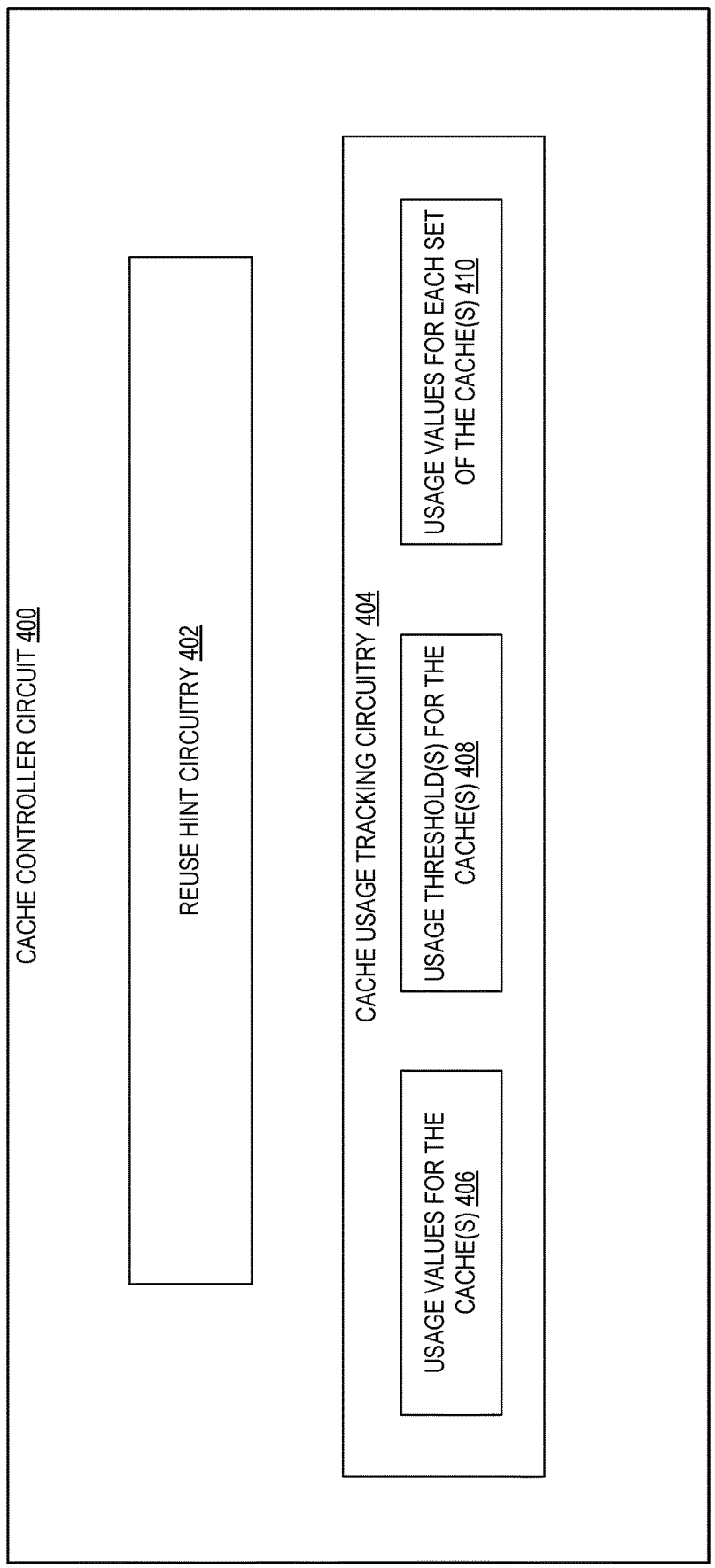
FIG. 4 illustrates a cache controller circuit according to embodiments of the disclosure.

FIG. 4 illustrates a cache controller circuit 400 according to embodiments of the disclosure. Cache controller circuits in the other figures (e.g., FIG. 1) may be an instance of cache controller circuit 400. Depicted cache controller circuit 400 includes reuse hint circuitry 402 to access a reuse hint value associated with a memory request, e.g., and to separate that hint value from the memory request before sending the memory request to be serviced. Depicted cache controller circuit 400 includes cache usage tracking circuitry 404, e.g., to maintain one or more (e.g., any combination of) usage values for the cache(s) 406 (for example, the age, e.g., the time each cache line has been resident in a cache), usage threshold(s) for the cache 408 (for example, to control the bypassing of filling data into the cache as discussed herein), and/or the usage values for each set in a cache(s) 410 (for example, the age, e.g., the time each cache line has been resident in a cache, for each particular set (e.g., way)).

Figure 5:
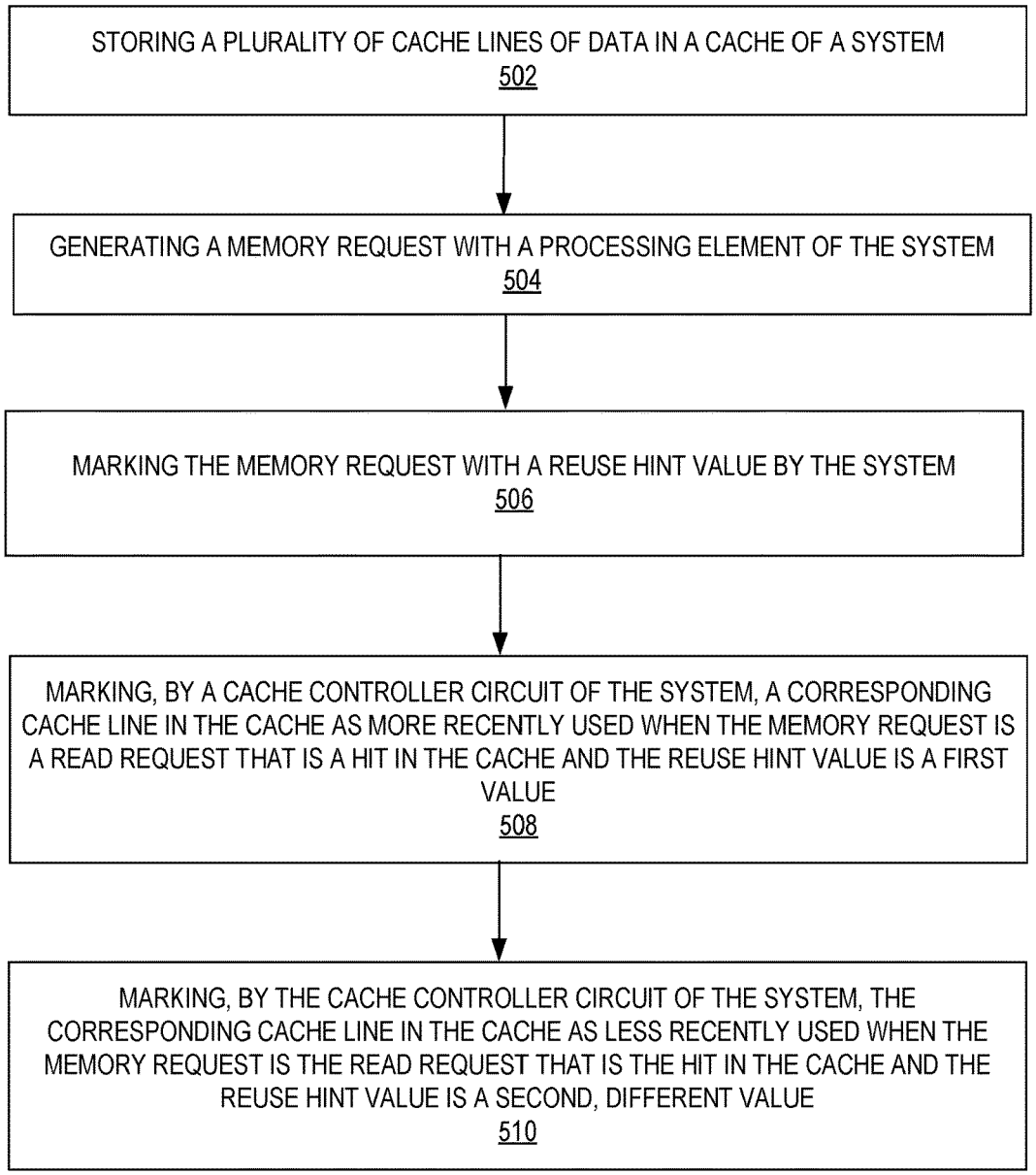
FIG. 5 illustrates a method of marking a cache line for a read request that hits in a cache according to embodiments of the disclosure.

FIG. 5 illustrates a method 500 of marking a cache line for a read request that hits in a cache according to embodiments of the disclosure. Depicted method 500 includes storing a plurality of cache lines of data in a cache of a system at 502, generating a memory request with a processing element of the system at 504, marking the memory request with a reuse hint value by the system at 506, marking, by a cache controller circuit of the system, a corresponding cache line in the cache as more recently used when the memory request is a read request that is a hit in the cache and the reuse hint value is a first value at 508, and marking, by the cache controller circuit of the system, the corresponding cache line in the cache as less recently used when the memory request is the read request that is the hit in the cache and the reuse hint value is a second, different value at 510.

Exemplary architectures, systems, etc. that the above may be used in are detailed below.

At least some embodiments of the disclosed technologies can be described in view of the following examples:

Example 1. A hardware processor comprising:
a cache to store a plurality of cache lines of data;
a processing element to generate a memory request and mark the memory request with a reuse hint value; and
a cache controller circuit to:
mark a corresponding cache line in the cache as more recently used when the memory request is a read request that is a hit in the cache and the reuse hint value is a first value, and
mark the corresponding cache line in the cache as less recently used when the memory request is the read request that is the hit in the cache and the reuse hint value is a second, different value.

Example 2. The hardware processor of example 1, wherein the cache controller circuit is to, when the memory request is a read request that is a miss in the cache and the reuse hint value is the second, different value, not fill the cache with a cache line of data for the miss.

Example 3. The hardware processor of example 2, wherein the cache controller circuit is to, when the memory request is the read request that is the miss in the cache and the reuse hint value is the second, different value, send the cache line of data to the processing element.

Example 4. The hardware processor of example 3, wherein the cache is a last level cache, and the cache line of data is sent to a numerically lower-level cache of the processing element.

Example 5. The hardware processor of example 2, wherein the cache controller circuit is to, when the memory request is the read request that is the miss in the cache and the reuse hint value is the first value, fill the cache with the cache line of data for the miss.

Example 6. The hardware processor of example 1, wherein the cache controller circuit is to, when the memory request is a write request that is a miss in the cache and a number of least recently used cache lines in a same cache set does not exceed a threshold value, not fill the cache with a cache line of data for the miss.

Example 7. The hardware processor of example 6, wherein the cache controller circuit is to, when the memory request is the write request that is the miss in the cache and the number of least recently used cache lines in the same cache set exceeds the threshold value, fill the cache with the cache line of data for the miss.

Example 8. The hardware processor of example 7, wherein the cache controller circuit is to, when the memory request is a write request that is a hit in the cache, fill the cache with a cache line of data for the hit.

Example 9. A method comprising:
storing a plurality of cache lines of data in a cache of a system;
generating a memory request with a processing element of the system;
marking the memory request with a reuse hint value by the system;
marking, by a cache controller circuit of the system, a corresponding cache line in the cache as more recently used when the memory request is a read request that is a hit in the cache and the reuse hint value is a first value; and
marking, by the cache controller circuit of the system, the corresponding cache line in the cache as less recently used when the memory request is the read request that is the hit in the cache and the reuse hint value is a second, different value.

Example 10. The method of example 9, further comprising, when the memory request is a read request that is a miss in the cache and the reuse hint value is the second, different value, not filling the cache with a cache line of data for the miss by the cache controller circuit.

Example 11. The method of example 10, further comprising, when the memory request is the read request that is the miss in the cache and the reuse hint value is the second, different value, sending the cache line of data to the processing element.

Example 12. The method of example 11, wherein the cache is a last level cache, and the sending of the cache line of data is to a numerically lower-level cache of the processing element.

Example 13. The method of example 10, further comprising, when the memory request is the read request that is the miss in the cache and the reuse hint value is the first value, filling the cache with the cache line of data for the miss by the cache controller circuit.

Example 14. The method of example 9, further comprising, when the memory request is a write request that is a miss in the cache and a number of least recently used cache lines in a same cache set does not exceed a threshold value, not filling the cache with a cache line of data for the miss by the cache controller circuit.

Example 15. The method of example 14, further comprising, when the memory request is the write request that is the miss in the cache and the number of least recently used cache lines in the same cache set exceeds the threshold value, filling the cache with the cache line of data for the miss by the cache controller circuit.

Example 16. The method of example 15, further comprising, when the memory request is a write request that is a hit in the cache, filling the cache with a cache line of data for the hit.

Example 17. A system comprising:
a hardware processor comprising:
a cache to store a plurality of cache lines of data, and
a processing element to generate a memory request and mark the memory request with a reuse hint value;
a memory coupled to the hardware processor; and
a cache controller circuit to:
mark a corresponding cache line in the cache as more recently used when the memory request is a read request that is a hit in the cache and the reuse hint value is a first value, and
mark the corresponding cache line in the cache as less recently used when the memory request is the read request that is the hit in the cache and the reuse hint value is a second, different value.

Example 18. The system of example 17, wherein the cache controller circuit is to, when the memory request is a read request that is a miss in the cache and the reuse hint value is the second, different value, not fill the cache with a cache line of data for the miss.

Example 19. The system of example 18, wherein the cache controller circuit is to, when the memory request is the read request that is the miss in the cache and the reuse hint value is the second, different value, send the cache line of data to the processing element from the memory.

Example 20. The system of example 19, wherein the cache is a last level cache, and the cache line of data is sent to a numerically lower-level cache of the processing element.

Example 21. The system of example 18, wherein the cache controller circuit is to, when the memory request is the read request that is the miss in the cache and the reuse hint value is the first value, fill the cache with the cache line of data for the miss from the memory.

Example 22. The system of example 17, wherein the cache controller circuit is to, when the memory request is a write request that is a miss in the cache and a number of least recently used cache lines in a same cache set does not exceed a threshold value, not fill the cache with a cache line of data for the miss.

Example 23. The system of example 22, wherein the cache controller circuit is to, when the memory request is the write request that is the miss in the cache and the number of least recently used cache lines in the same cache set exceeds the threshold value, fill the cache with the cache line of data for the miss.

Example 24. The system of example 23, wherein the cache controller circuit is to, when the memory request is a write request that is a hit in the cache, fill the cache with a cache line of data for the hit from the memory.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary graphics processors are described next. Followed by exemplary core architectures, and descriptions of exemplary processors and computer architectures.

Graphics Processor Architectures

FIGS. 6A-6D illustrate computing systems and graphics processors provided by embodiments described herein. The elements of FIGS. 6A-6D having the same reference numbers (or names) as the elements of any other figure herein can operate or function in any manner similar to that described elsewhere herein but are not limited to such. A request for memory (e.g., a memory access) may be generated by a component of a graphics processor.

Figure 6A:
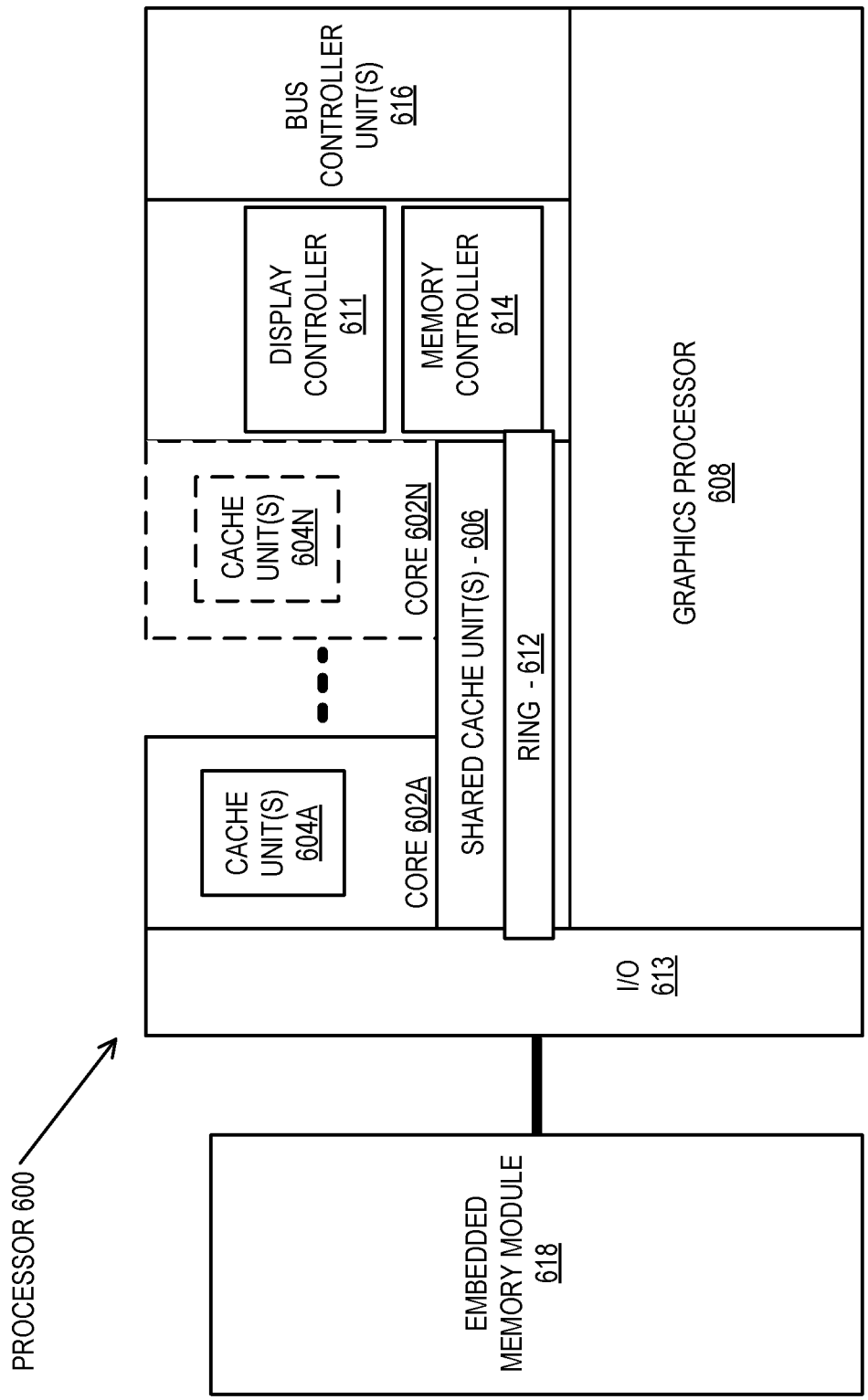
FIGS. 6A-6D illustrate computing systems and graphics processors according to embodiments of the disclosure.

FIG. 6A is a block diagram of an embodiment of a processor 600 having one or more processor cores 602A-602N, an integrated memory controller 614 (e.g., including cache controller circuit 400), and an integrated graphics processor 608. Processor 600 can include additional cores up to and including additional core 602N represented by the dashed lined boxes. Each of processor cores 602A-602N includes one or more internal cache units 604A-604N. In some embodiments each processor core also has access to one or more shared cached units 606. The internal cache units 604A-604N and shared cache units 606 represent a cache memory hierarchy within the processor 600. The cache memory hierarchy may include at least one level of instruction and data cache within each processor core and one or more levels of shared mid-level cache, such as a Level 6 (L2), Level 3 (L3), Level 4 (L4), or other levels of cache, where the highest level of cache before external memory is classified as the LLC. In some embodiments, cache coherency logic maintains coherency between the various cache units 606 and 604A-604N.

In some embodiments, processor 600 may also include a set of one or more bus controller units 616 and a system agent core 610. The one or more bus controller units 616 manage a set of peripheral buses, such as one or more PCI or PCI express busses. System agent core 610 provides management functionality for the various processor components. In some embodiments, system agent core 610 includes one or more integrated memory controllers 614 to manage access to various external memory devices (not shown).

In some embodiments, one or more of the processor cores 602A-602N include support for simultaneous multi-threading. In such embodiment, the system agent core 610 includes components for coordinating and operating cores 602A-602N during multi-threaded processing. System agent core 610 may additionally include a power control unit (PCU), which includes logic and components to regulate the power state of processor cores 602A-602N and graphics processor 608.

In some embodiments, processor 600 additionally includes graphics processor 608 to execute graphics processing operations. In some embodiments, the graphics processor 608 couples with the set of shared cache units 606, and the system agent core 610, including the one or more integrated memory controllers 614. In some embodiments, the system agent core 610 also includes a display controller 611 to drive graphics processor output to one or more coupled displays. In some embodiments, display controller 611 may also be a separate module coupled with the graphics processor via at least one interconnect or may be integrated within the graphics processor 608.

In some embodiments, a ring-based interconnect unit 612 is used to couple the internal components of the processor 600. However, an alternative interconnect unit may be used, such as a point-to-point interconnect, a switched interconnect, or other techniques, including techniques well known in the art. In some embodiments, graphics processor 608 couples with the ring interconnect 612 via an I/O link 613.

The exemplary I/O link 613 represents at least one of multiple varieties of I/O interconnects, including an on package I/O interconnect which facilitates communication between various processor components and a high-performance embedded memory module 618, such as an eDRAM module. In some embodiments, each of the processor cores 602A-602N and graphics processor 608 can use embedded memory modules 618 as a shared Last Level Cache.

In some embodiments, processor cores 602A-602N are homogenous cores executing the same instruction set architecture. In another embodiment, processor cores 602A-602N are heterogeneous in terms of instruction set architecture (ISA), where one or more of processor cores 602A-602N execute a first instruction set, while at least one of the other cores executes a subset of the first instruction set or a different instruction set. In one embodiment, processor cores 602A-602N are heterogeneous in terms of microarchitecture, where one or more cores having a relatively higher power consumption couple with one or more power cores having a lower power consumption. In one embodiment, processor cores 602A-602N are heterogeneous in terms of computational capability. Additionally, processor 600 can be implemented on one or more chips or as an SoC integrated circuit having the illustrated components, in addition to other components.

Figure 6B:
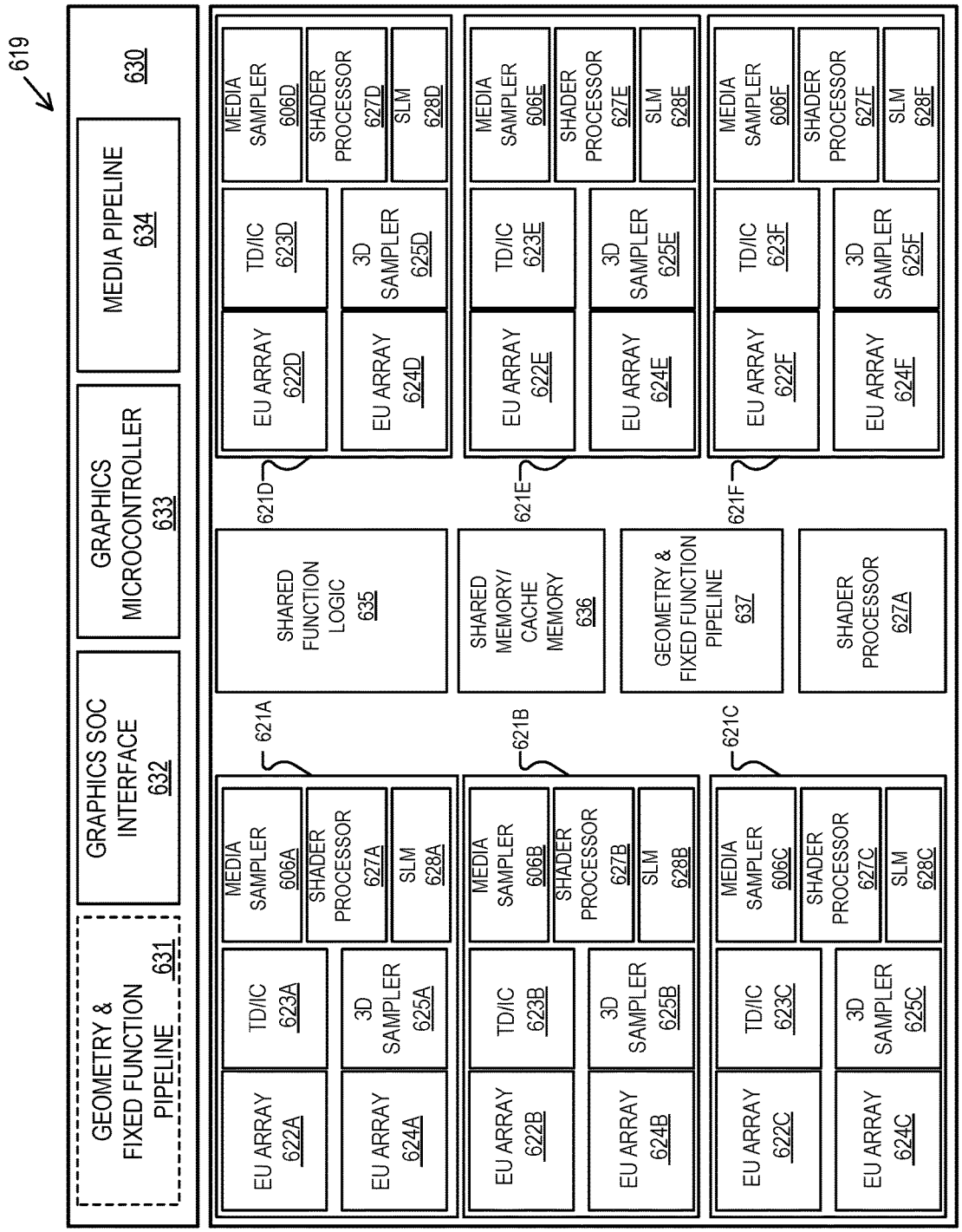

FIG. 6B is a block diagram of hardware logic of a graphics processor core 619, according to some embodiments described herein. Elements of FIG. 6B having the same reference numbers (or names) as the elements of any other figure herein can operate or function in any manner similar to that described elsewhere herein, but are not limited to such. The graphics processor core 619, sometimes referred to as a core slice, can be one or multiple graphics cores within a modular graphics processor. The graphics processor core 619 is exemplary of one graphics core slice, and a graphics processor as described herein may include multiple graphics core slices based on target power and performance envelopes. Each graphics processor core 619 can include a fixed function block 630 coupled with multiple sub-cores 621A-621F, also referred to as sub-slices, that include modular blocks of general-purpose and fixed function logic.

In some embodiments, the fixed function block 630 includes a geometry/fixed function pipeline 631 that can be shared by all sub-cores in the graphics processor core 619, for example, in lower performance and/or lower power graphics processor implementations. In various embodiments, the geometry/fixed function pipeline 631 includes a 3D fixed function pipeline, a video front-end unit, a thread spawner and thread dispatcher, and a unified return buffer manager, which manages unified return buffers.

In one embodiment the fixed function block 630 also includes a graphics SoC interface 632, a graphics microcontroller 633, and a media pipeline 634. The graphics SoC interface 632 provides an interface between the graphics processor core 619 and other processor cores within a system on a chip integrated circuit. The graphics microcontroller 633 is a programmable sub-processor that is configurable to manage various functions of the graphics processor core 619, including thread dispatch, scheduling, and preemption. The media pipeline 634 includes logic to facilitate the decoding, encoding, pre-processing, and/or post-processing of multimedia data, including image and video data. The media pipeline 634 implement media operations via requests to compute or sampling logic within the sub-cores 621-621F.

In one embodiment the SoC interface 632 enables the graphics processor core 619 to communicate with general-purpose application processor cores (e.g., CPUs) and/or other components within an SoC, including memory hierarchy elements such as a shared last level cache memory, the system RAM, and/or embedded on-chip or on-package DRAM. The SoC interface 632 can also enable communication with fixed function devices within the SoC, such as camera imaging pipelines, and enables the use of and/or implements global memory atomics that may be shared between the graphics processor core 619 and cores (e.g., logical CPUs) within the SoC. The SoC interface 632 can also implement power management controls for the graphics processor core 619 and enable an interface between a clock domain of the graphic core 619 and other clock domains within the SoC. In one embodiment the SoC interface 632 enables receipt of command buffers from a command streamer and global thread dispatcher that are configured to provide commands and instructions to each of one or more graphics cores within a graphics processor. The commands and instructions can be dispatched to the media pipeline 634, when media operations are to be performed, or a geometry and fixed function pipeline (e.g., geometry and fixed function pipeline 631, geometry and fixed function pipeline 637) when graphics processing operations are to be performed.

The graphics microcontroller 633 can be configured to perform various scheduling and management tasks for the graphics processor core 619. In one embodiment the graphics microcontroller 633 can perform graphics and/or compute workload scheduling on the various graphics processing elements, e.g., parallel engines within execution unit (EU) arrays 622A-622F, 624A-624F within the sub-cores 621A-621F. In this scheduling model, host software executing on a CPU core of an SoC including the graphics processor core 619 can submit workloads one of multiple graphic processor doorbells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one embodiment the graphics microcontroller 633 can also facilitate low-power or idle states for the graphics processor core 619, providing the graphics processor core 619 with the ability to save and restore registers within the graphics processor core 619 across low-power state transitions independently from the operating system and/or graphics driver software on the system.

The graphics processor core 619 may have greater than or fewer than the illustrated sub-cores 621A-621F, up to N modular sub-cores. For each set of N sub-cores, the graphics processor core 619 can also include shared function logic 635, shared and/or cache memory 636, a geometry/fixed function pipeline 637, as well as additional fixed function logic 638 to accelerate various graphics and compute processing operations. The shared function logic 635 can include logic units associated with sampler, math, and/or inter-thread communication logic that can be shared by each N sub-cores within the graphics processor core 619. The shared and/or cache memory 636 can be a last-level cache for the set of N sub-cores 621A-621F within the graphics processor core 619, and can also serve as shared memory that is accessible by multiple sub-cores. The geometry/fixed function pipeline 637 can be included instead of the geometry/fixed function pipeline 631 within the fixed function block 630 and can include the same or similar logic units.

In one embodiment the graphics processor core 619 includes additional fixed function logic 638 that can include various fixed function acceleration logic for use by the graphics processor core 619. In one embodiment the additional fixed function logic 638 includes an additional geometry pipeline for use in position only shading. In position-only shading, two geometry pipelines exist, the full geometry pipeline within the geometry/fixed function pipeline 638, 631, and a cull pipeline, which is an additional geometry pipeline which may be included within the additional fixed function logic 638. In one embodiment the cull pipeline is a trimmed down version of the full geometry pipeline. The full pipeline and the cull pipeline can execute different instances of the same application, each instance having a separate context. Position only shading can hide long cull runs of discarded triangles, enabling shading to be completed earlier in some instances. For example and in one embodiment the cull pipeline logic within the additional fixed function logic 638 can execute position shaders in parallel with the main application and generally generates critical results faster than the full pipeline, as the cull pipeline fetches and shades only the position attribute of the vertices, without performing rasterization and rendering of the pixels to the frame buffer. The cull pipeline can use the generated critical results to compute visibility information for all the triangles without regard to whether those triangles are culled. The full pipeline (which in this instance may be referred to as a replay pipeline) can consume the visibility information to skip the culled triangles to shade only the visible triangles that are finally passed to the rasterization phase.

In one embodiment the additional fixed function logic 638 can also include machine-learning acceleration logic, such as fixed function matrix multiplication logic, for implementations including optimizations for machine learning training or inferencing.

Within each graphics sub-core 621A-621F includes a set of execution resources that may be used to perform graphics, media, and compute operations in response to requests by graphics pipeline, media pipeline, or shader programs. The graphics sub-cores 621A-621F include multiple EU arrays 622A-622F, 624A-624F, thread dispatch and inter-thread communication (TD/IC) logic 623A-623F, a 3D (e.g., texture) sampler 625A-625F, a media sampler 606A-606F, a shader processor 627A-627F, and shared local memory (SLM) 628A-628F. The EU arrays 622A-622F, 624A-624F each include multiple execution units, which are general-purpose graphics processing units capable of performing floating-point and integer/fixed-point logic operations in service of a graphics, media, or compute operation, including graphics, media, or compute shader programs. The TD/IC logic 623A-623F performs local thread dispatch and thread control operations for the execution units within a sub-core and facilitate communication between threads executing on the execution units of the sub-core. The 3D sampler 625A-625F can read texture or other 3D graphics related data into memory. The 3D sampler can read texture data differently based on a configured sample state and the texture format associated with a given texture. The media sampler 606A-606F can perform similar read operations based on the type and format associated with media data. In one embodiment, each graphics sub-core 621A-621F can alternately include a unified 3D and media sampler. Threads executing on the execution units within each of the sub-cores 621A-621F can make use of shared local memory 628A-628F within each sub-core, to enable threads executing within a thread group to execute using a common pool of on-chip memory.

Figure 6C:
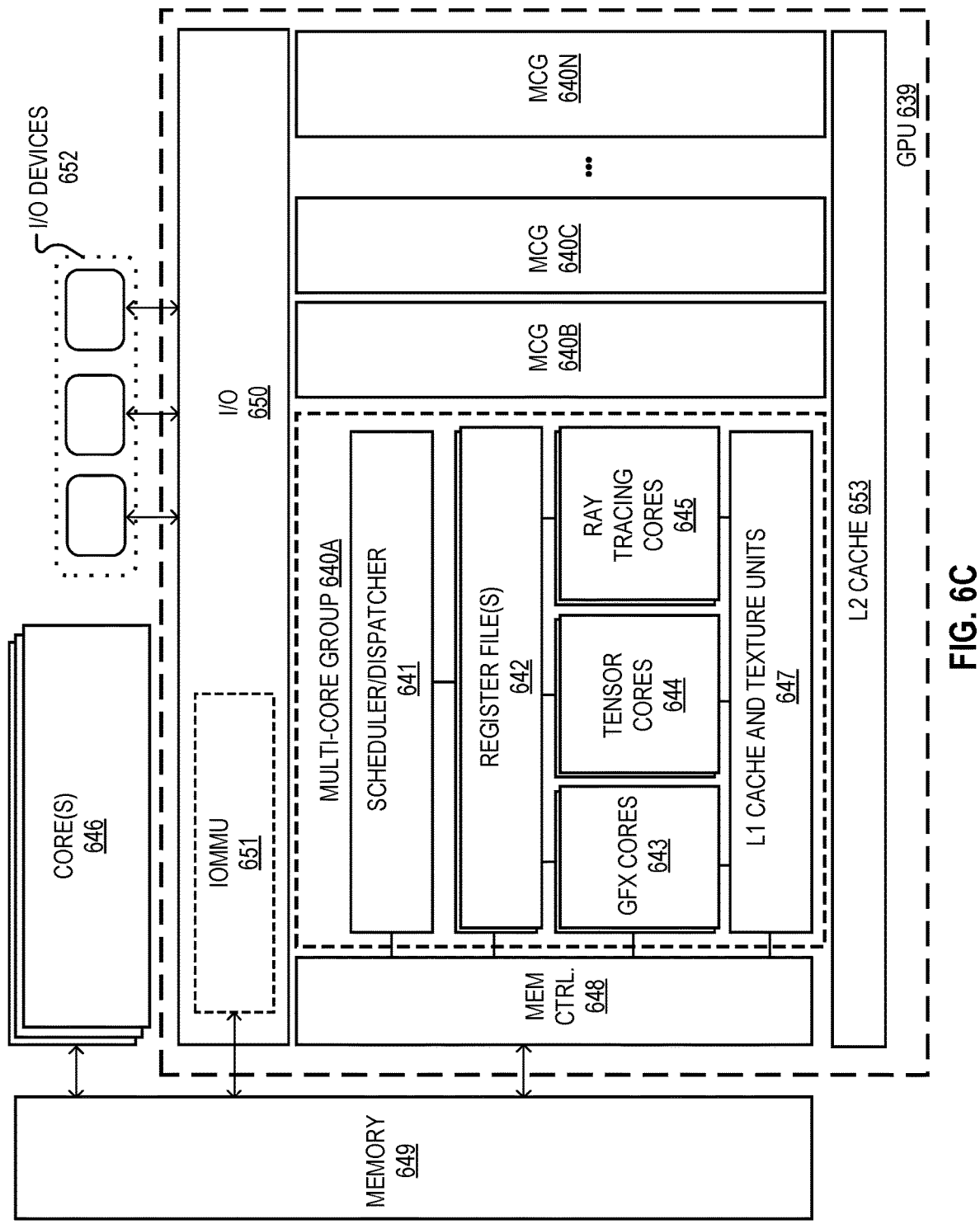

FIG. 6C illustrates a graphics processing unit (GPU) 639 that includes dedicated sets of graphics processing resources arranged into multi-core groups 640A-640N. While the details of only a single multi-core group 640A are provided, it will be appreciated that the other multi-core groups 640B-640N may be equipped with the same or similar sets of graphics processing resources.

As illustrated, a multi-core group 640A may include a set of graphics cores 643, a set of tensor cores 644, and a set of ray tracing cores 645. A scheduler/dispatcher 641 schedules and dispatches the graphics threads for execution on the various cores 643, 644, 645. A set of register files 642 store operand values used by the cores 643, 644, 645 when executing the graphics threads. These may include, for example, integer registers for storing integer values, floating point registers for storing floating point values, vector registers for storing packed data elements (integer and/or floating point data elements) and tile registers for storing tensor/matrix values. In one embodiment, the tile registers are implemented as combined sets of vector registers.

One or more combined level 1 (L1) caches and shared memory units 647 store graphics data such as texture data, vertex data, pixel data, ray data, bounding volume data, etc., locally within each multi-core group 640A. One or more texture units 647 can also be used to perform texturing operations, such as texture mapping and sampling. A Level 6 (L2) cache 653 shared by all or a subset of the multi-core groups 640A-640N stores graphics data and/or instructions for multiple concurrent graphics threads. As illustrated, the L2 cache 653 may be shared across a plurality of multi-core groups 640A-640N. One or more memory controllers 648 (e.g., including cache controller circuit 400) couple the GPU 639 to a memory 649 which may be a system memory (e.g., DRAM) and/or a dedicated graphics memory (e.g., GDDR6 memory).

Input/output (I/O) circuitry 650 couples the GPU 639 to one or more I/O devices 652 such as digital signal processors (DSPs), network controllers, or user input devices. An on-chip interconnect may be used to couple the I/O devices 652 to the GPU 639 and memory 649. One or more I/O memory management units (IOMMUs) 651 of the I/O circuitry 650 couple the I/O devices 652 directly to the system memory 649. In one embodiment, the IOMMU 651 manages multiple sets of page tables to map virtual addresses to physical addresses in system memory 649. In this embodiment, the I/O devices 652, core(s) 646, and GPU(s) 639 may share the same virtual address space.

In one implementation, the IOMMU 651 supports virtualization. In this case, it may manage a first set of page tables to map guest/graphics virtual addresses to guest/graphics physical addresses and a second set of page tables to map the guest/graphics physical addresses to system/host physical addresses (e.g., within system memory 649). The base addresses of each of the first and second sets of page tables may be stored in control registers and swapped out on a context switch (e.g., so that the new context is provided with access to the relevant set of page tables). While not illustrated in FIG. 6C, each of the cores 643, 644, 645 and/or multi-core groups 640A-640N may include translation lookaside buffers (TLBs) to cache guest virtual to guest physical translations, guest physical to host physical translations, and guest virtual to host physical translations.

In one embodiment, the core(s) 646, GPU(s) 639, and I/O devices 652 are integrated on a single semiconductor chip and/or chip package. The illustrated memory 649 may be integrated on the same chip or may be coupled to the memory controllers 648 via an off-chip interface. In one implementation, the memory 649 comprises GDDR6 memory which shares the same virtual address space as other physical system-level memories, although the underlying principles of the invention are not limited to this specific implementation.

In one embodiment, the tensor cores 644 include a plurality of execution units specifically designed to perform matrix operations, which are the fundamental compute operation used to perform deep learning operations. For example, simultaneous matrix multiplication operations may be used for neural network training and inferencing. The tensor cores 644 may perform matrix processing using a variety of operand precisions including single precision floating-point (e.g., 32 bits), half-precision floating point (e.g., 16 bits), integer words (16 bits), bytes (8 bits), and half-bytes (4 bits). In one embodiment, a neural network implementation extracts features of each rendered scene, potentially combining details from multiple frames, to construct a high-quality final image.

In deep learning implementations, parallel matrix multiplication work may be scheduled for execution on the tensor cores 644. The training of neural networks, in particular, requires a significant number matrix dot product operations. In order to process an inner-product formulation of an N×N×N matrix multiply, the tensor cores 644 may include at least N dot-product processing elements. Before the matrix multiply begins, one entire matrix is loaded into tile registers and at least one column of a second matrix is loaded each cycle for N cycles. Each cycle, there are N dot products that are processed.

Matrix elements may be stored at different precisions depending on the particular implementation, including 16-bit words, 8-bit bytes (e.g., INT8) and 4-bit half-bytes (e.g., INT4). Different precision modes may be specified for the tensor cores 644 to ensure that the most efficient precision is used for different workloads (e.g., such as inferencing workloads which can tolerate quantization to bytes and half-bytes).

In one embodiment, the ray tracing cores 645 accelerate ray tracing operations for both real-time ray tracing and non-real-time ray tracing implementations. In particular, the ray tracing cores 645 include ray traversal/intersection circuitry for performing ray traversal using bounding volume hierarchies (BVHs) and identifying intersections between rays and primitives enclosed within the BVH volumes. The ray tracing cores 645 may also include circuitry for performing depth testing and culling (e.g., using a Z buffer or similar arrangement). In one implementation, the ray tracing cores 645 perform traversal and intersection operations in concert with the image denoising techniques described herein, at least a portion of which may be executed on the tensor cores 644. For example, in one embodiment, the tensor cores 644 implement a deep learning neural network to perform denoising of frames generated by the ray tracing cores 645. However, the (e.g., CPU) core(s) 646, graphics cores 643, and/or ray tracing cores 645 may also implement all or a portion of the denoising and/or deep learning algorithms.

In addition, as described above, a distributed approach to denoising may be employed in which the GPU 639 is in a computing device coupled to other computing devices over a network or high speed interconnect. In this embodiment, the interconnected computing devices share neural network learning/training data to improve the speed with which the overall system learns to perform denoising for different types of image frames and/or different graphics applications.

In one embodiment, the ray tracing cores 645 process all BVH traversal and ray-primitive intersections, saving the graphics cores 643 from being overloaded with thousands of instructions per ray. In one embodiment, each ray tracing core 645 includes a first set of specialized circuitry for performing bounding box tests (e.g., for traversal operations) and a second set of specialized circuitry for performing the ray-triangle intersection tests (e.g., intersecting rays which have been traversed). Thus, in one embodiment, the multi-core group 640A can simply launch a ray probe, and the ray tracing cores 645 independently perform ray traversal and intersection and return hit data (e.g., a hit, no hit, multiple hits, etc.) to the thread context. The other cores 643, 644 are freed to perform other graphics or compute work while the ray tracing cores 645 perform the traversal and intersection operations.

In one embodiment, each ray tracing core 645 includes a traversal unit to perform BVH testing operations and an intersection unit which performs ray-primitive intersection tests. The intersection unit generates a "hit", "no hit", or "multiple hit" response, which it provides to the appropriate thread. During the traversal and intersection operations, the execution resources of the other cores (e.g., graphics cores 643 and tensor cores 644) are freed to perform other forms of graphics work.

In one particular embodiment described below, a hybrid rasterization/ray tracing approach is used in which work is distributed between the graphics cores 643 and ray tracing cores 645.

In one embodiment, the ray tracing cores 645 (and/or other cores 643, 644) include hardware support for a ray tracing instruction set such as Microsoft's DirectX Ray Tracing (DXR) which includes a DispatchRays command, as well as ray-generation, closest-hit, any-hit, and miss shaders, which enable the assignment of unique sets of shaders and textures for each object. Another ray tracing platform which may be supported by the ray tracing cores 645, graphics cores 643 and tensor cores 644 is according to the Vulkan 1.1.85 specification. Note, however, that the underlying principles of the invention are not limited to any particular ray tracing ISA.

In general, the various cores 645, 644, 643 may support a ray tracing instruction set that includes instructions/functions for ray generation, closest hit, any hit, ray-primitive intersection, per-primitive and hierarchical bounding box construction, miss, visit, and exceptions. More specifically, one embodiment includes ray tracing instructions to perform the following functions:

Ray Generation—Ray generation instructions may be executed for each pixel, sample, or other user-defined work assignment.

Closest Hit—A closest hit instruction may be executed to locate the closest intersection point of a ray with primitives within a scene.

Any Hit—An any hit instruction identifies multiple intersections between a ray and primitives within a scene, potentially to identify a new closest intersection point.

Intersection—An intersection instruction performs a ray-primitive intersection test and outputs a result.

Per-primitive Bounding box Construction—This instruction builds a bounding box around a given primitive or group of primitives (e.g., when building a new BVH or other acceleration data structure).

Miss—Indicates that a ray misses all geometry within a scene, or specified region of a scene.

Visit—Indicates the children volumes a ray will traverse.

Exceptions—Includes various types of exception handlers (e.g., invoked for various error conditions).

Figure 6D:
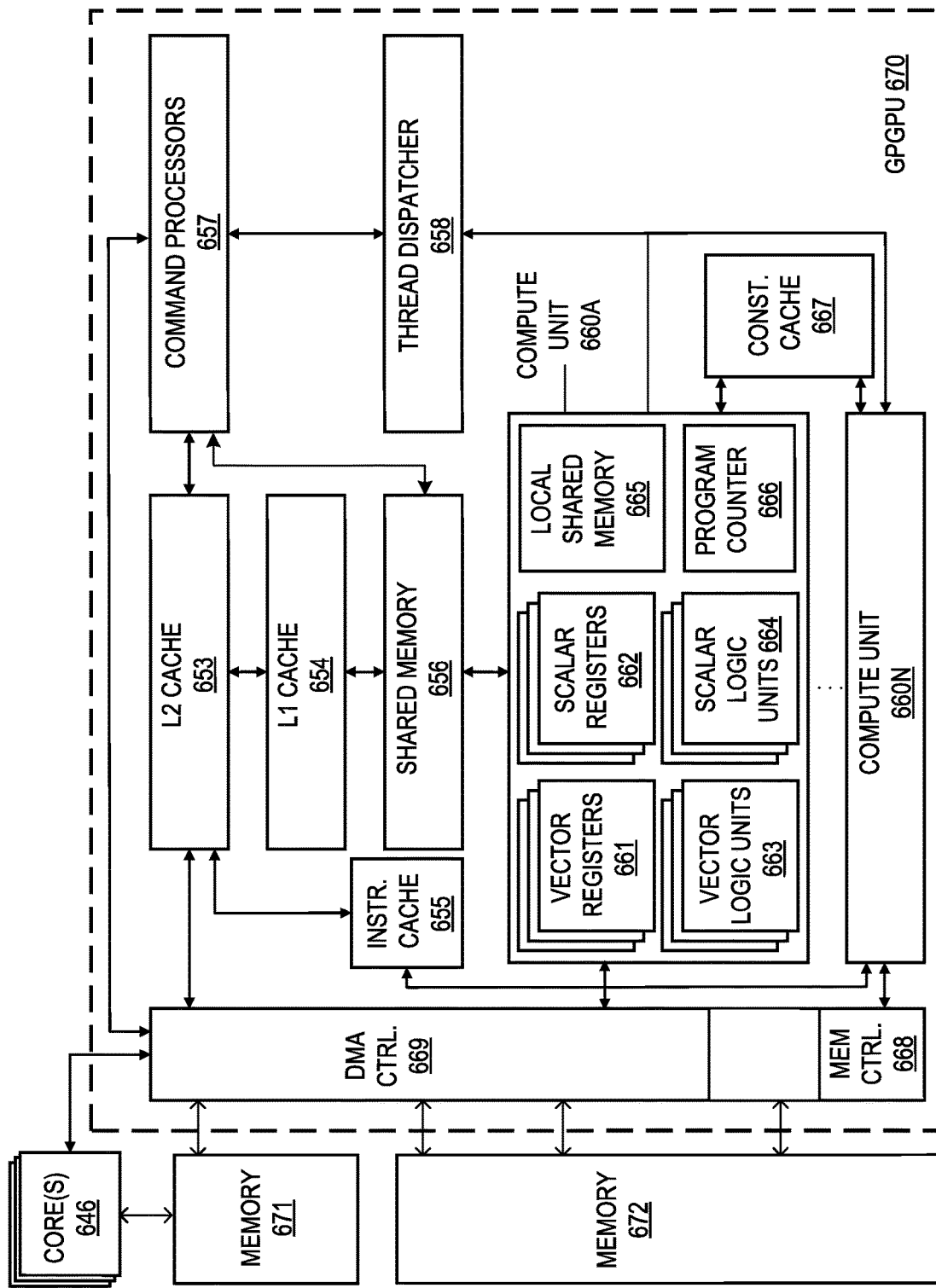

FIG. 6D is a block diagram of general purpose graphics processing unit (GPGPU) 670 that can be configured as a graphics processor and/or compute accelerator, according to embodiments described herein. The GPGPU 670 can interconnect with host processors (e.g., one or more core(s) 646) and memory 671, 672 via one or more system and/or memory busses. In one embodiment the memory 671 is system memory that may be shared with the one or more core(s) 646, while memory 672 is device memory that is dedicated to the GPGPU 670. In one embodiment, components within the GPGPU 670 and device memory 672 may be mapped into memory addresses that are accessible to the one or more core(s) 646. Access to memory 671 and 672 may be facilitated via a memory controller 668 (e.g., including cache controller circuit 400). In one embodiment the memory controller 668 includes an internal direct memory access (DMA) controller 669 or can include logic to perform operations that would otherwise be performed by a DMA controller.

The GPGPU 670 includes multiple cache memories, including an L2 cache 653, L1 cache 654, an instruction cache 655, and shared memory 656, at least a portion of which may also be partitioned as a cache memory. The GPGPU 670 also includes multiple compute units 660A-

660N. Each compute unit 660A-660N includes a set of vector registers 661, scalar registers 662, vector logic units 663, and scalar logic units 664. The compute units 660A-660N can also include local shared memory 665 and a program counter 666. The compute units 660A-660N can couple with a constant cache 667, which can be used to store constant data, which is data that will not change during the run of kernel or shader program that executes on the GPGPU 670. In one embodiment the constant cache 667 is a scalar data cache and cached data can be fetched directly into the scalar registers 662.

During operation, the one or more core(s) 646 can write commands into registers or memory in the GPGPU 670 that has been mapped into an accessible address space. The command processors 657 can read the commands from registers or memory and determine how those commands will be processed within the GPGPU 670. A thread dispatcher 658 can then be used to dispatch threads to the compute units 660A-660N to perform those commands. Each compute unit 660A-660N can execute threads independently of the other compute units. Additionally each compute unit 660A-660N can be independently configured for conditional computation and can conditionally output the results of computation to memory. The command processors 657 can interrupt the one or more core(s) 646 when the submitted commands are complete.

Exemplary Core Architectures
In-Order and Out-of-Order Core Block Diagram

FIG. 7A is a block diagram illustrating both an exemplary in-order pipeline and an exemplary register renaming, out-of-order issue/execution pipeline according to embodiments of the disclosure. FIG. 7B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 7A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macro-instructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit, a write mask registers unit, and a scalar registers unit. These register units may provide architectural vector registers, vector mask registers, and general purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2)

cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory.

In certain embodiments, a prefetch circuit 778 is included to prefetch data, for example, to predict access addresses and bring the data for those addresses into a cache or caches (e.g., from memory 780).

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 790 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 8B:
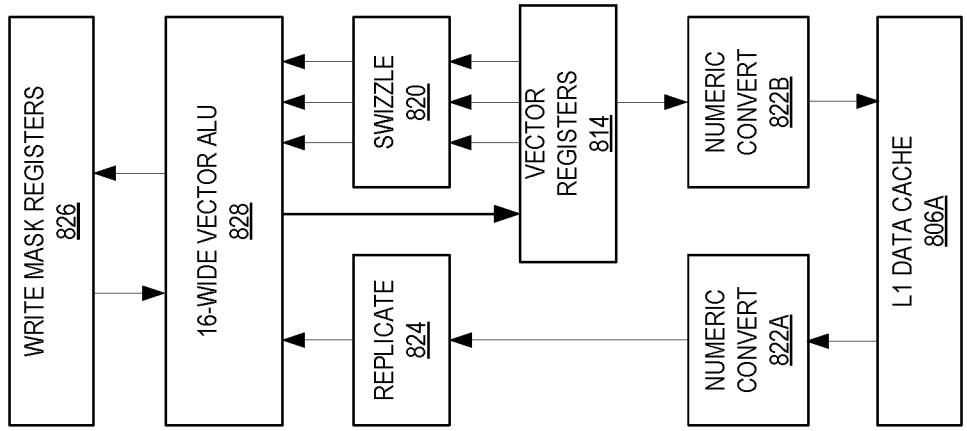
FIG. 8B is an expanded view of part of the processor core in FIG. 8A according to embodiments of the disclosure.
Figure 8A:
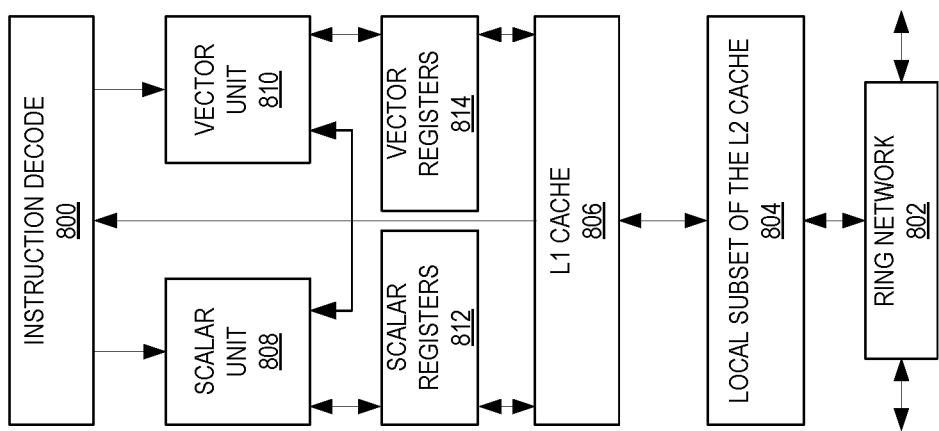
FIG. 8A is a block diagram of a single processor core, along with its connection to the on-die interconnect network and with its local subset of the Level 2 (L2) cache, according to embodiments of the disclosure.

FIGS. 8A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 8A is a block diagram of a single processor core, along with its connection to the on-die interconnect network 802 and with its local subset of the Level 2 (L2) cache 804, according to embodiments of the disclosure. In one embodiment, an instruction decode unit 800 supports the x86 instruction set with a packed data instruction set extension. An L1 cache 806 allows low-latency accesses to cache memory into the scalar and vector units. While in one embodiment (to simplify the design), a scalar unit 808 and a vector unit 810 use separate register sets (respectively, scalar registers 812 and vector registers 814) and data transferred between them is written to memory and then read back in from a level 1 (L1) cache 806, alternative embodiments of the disclosure may use a different approach (e.g., use a single register set or include a communication path that allow data to be transferred between the two register files without being written and read back).

The local subset of the L2 cache 804 is part of a global L2 cache that is divided into separate local subsets, one per processor core. Each processor core has a direct access path to its own local subset of the L2 cache 804. Data read by a processor core is stored in its L2 cache subset 804 and can be accessed quickly, in parallel with other processor cores accessing their own local L2 cache subsets. Data written by a processor core is stored in its own L2 cache subset 804 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 8B is an expanded view of part of the processor core in FIG. 8A according to embodiments of the disclosure. FIG. 8B includes an L1 data cache 806A part of the L1 cache 804, as well as more detail regarding the vector unit 810 and the vector registers 814. Specifically, the vector unit 810 is a 16-wide vector processing unit (VPU) (see the 16-wide ALU 828), which executes one or more of integer, single-precision float, and double-precision float instructions. The VPU supports swizzling the register inputs with swizzle unit 820, numeric conversion with numeric convert units 822A-B, and replication with replication unit 824 on the memory input. Write mask registers 826 allow predicating resulting vector writes.

Figure 9:
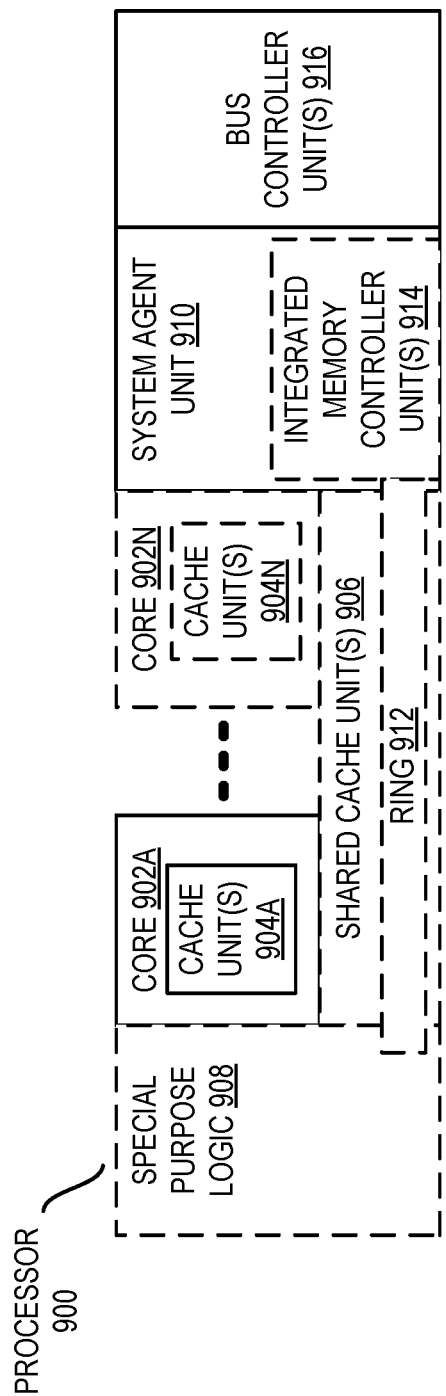
FIG. 9 is a block diagram of a processor that may have more than one core, may have an integrated memory controller, and may have integrated graphics according to embodiments of the disclosure.

FIG. 9 is a block diagram of a processor 900 that may have more than one core, may have an integrated memory controller, and may have integrated graphics according to embodiments of the disclosure. The solid lined boxes in FIG. 9 illustrate a processor 900 with a single core 902A, a system agent 910, a set of one or more bus controller units 916, while the optional addition of the dashed lined boxes illustrates an alternative processor 900 with multiple cores 902A-N, a set of one or more integrated memory controller unit(s) 914 in the system agent unit 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof. While in one embodiment a ring based interconnect unit 912 interconnects the integrated graphics logic 908, the set of shared cache units 906, and the system agent unit 910/integrated memory controller unit(s) 914, alternative embodiments may use any number of well-known techniques for interconnecting such units. In one embodiment, coherency is maintained between one or more cache units 906 and cores 902-A-N.

In some embodiments, one or more of the cores 902A-N are capable of multi-threading. The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture instruction set; that is, two or more of the cores 902A-N may be capable of execution the same instruction set, while others may be capable of executing only a subset of that instruction set or a different instruction set.

Exemplary Computer Architectures

FIGS. 10-13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 10:
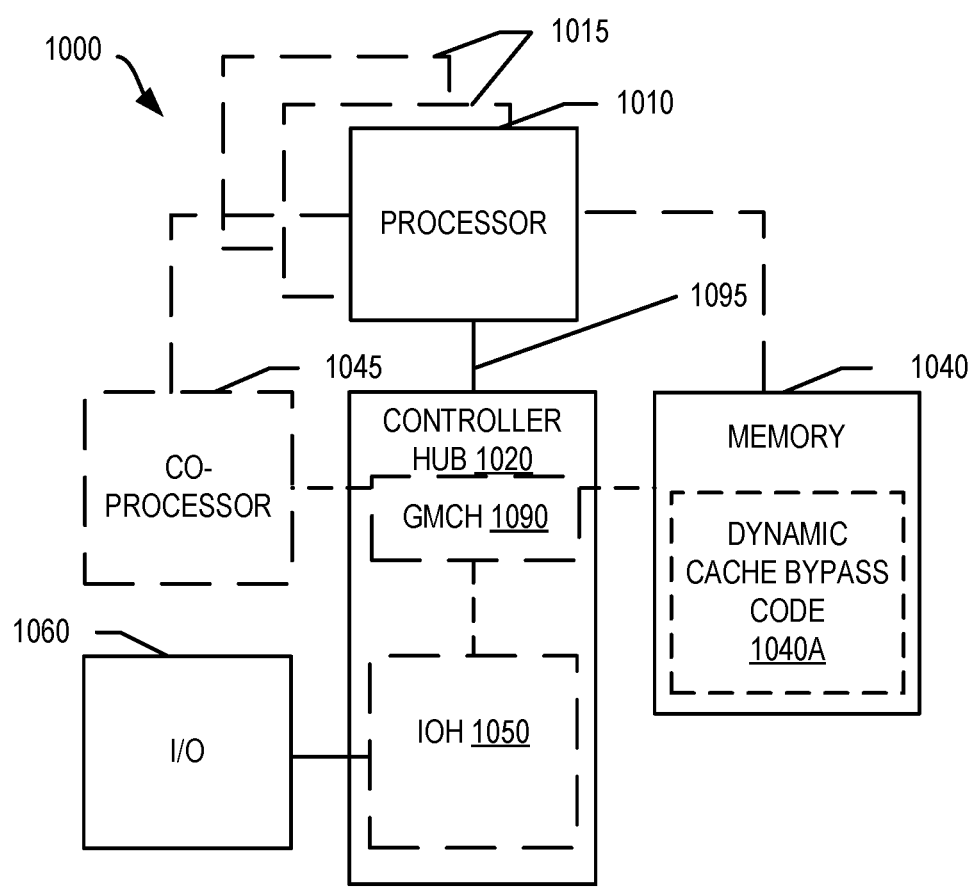
FIG. 10 is a block diagram of a system in accordance with one embodiment of the present disclosure.

Referring now to FIG. 10, shown is a block diagram of a system 1000 in accordance with one embodiment of the present disclosure. The system 1000 may include one or more processors 1010, 1015, which are coupled to a controller hub 1020. In one embodiment the controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a coprocessor 1045; the IOH 1050 is couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050. Memory 1040 may include dynamic cache bypass code 1040A, for example, to store code that when executed causes a processor to perform any method of this disclosure.

The optional nature of additional processors 1015 is denoted in FIG. 10 with broken lines. Each processor 1010, 1015 may include one or more of the processing cores described herein and may be some version of the processor 900.

The memory 1040 may be, for example, dynamic random access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface such as Quickpath Interconnect (QPI), or similar connection 1095.

In one embodiment, the coprocessor 1045 is a special-purpose processor, such as, for example, a high-throughput MIC processor, a network or communication processor, compression engine, graphics processor, GPGPU, embedded processor, or the like. In one embodiment, controller hub 1020 may include an integrated graphics accelerator.

There can be a variety of differences between the physical resources 1010, 1015 in terms of a spectrum of metrics of merit including architectural, microarchitectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
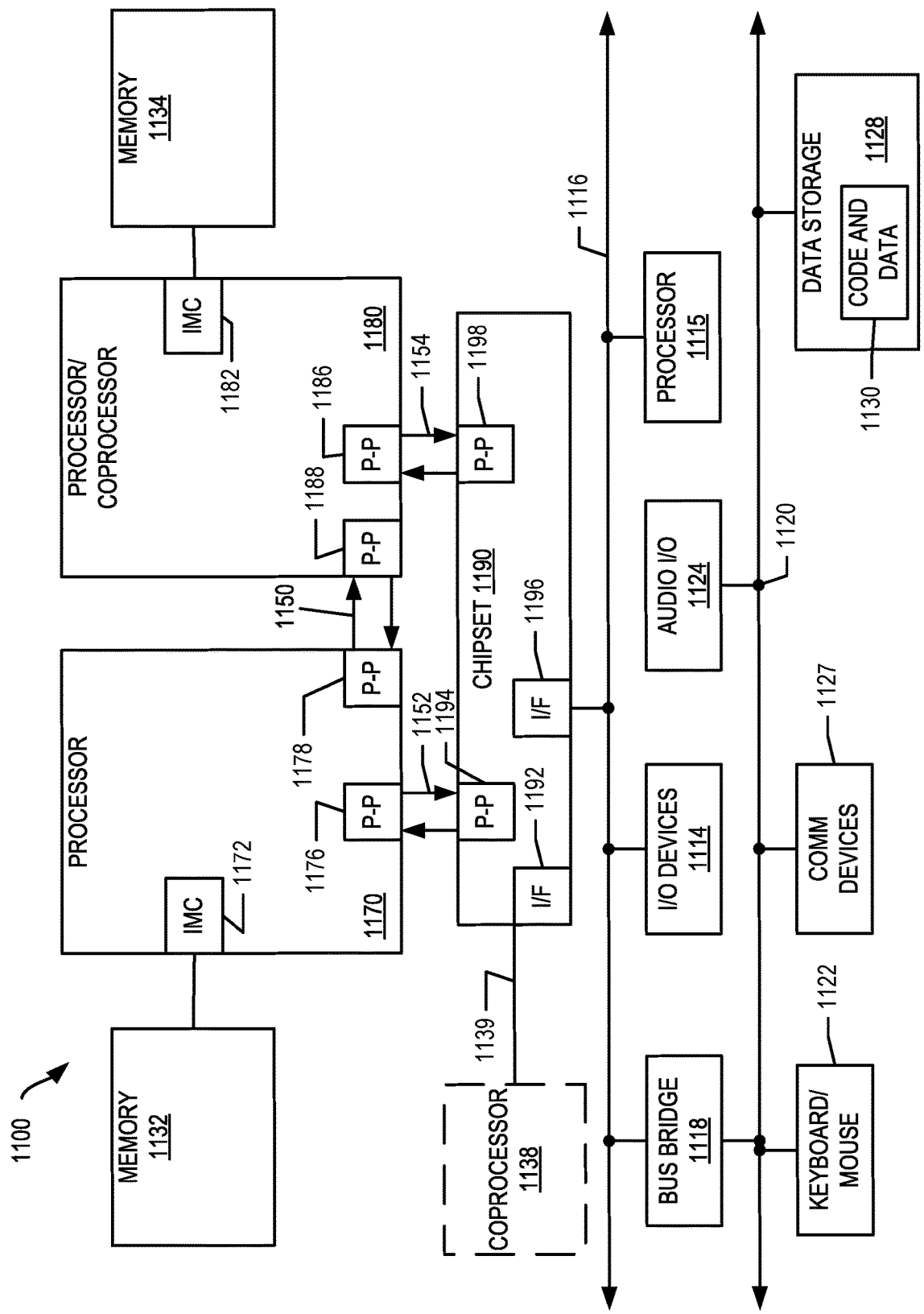
FIG. 11 is a block diagram of a more specific exemplary system in accordance with an embodiment of the present disclosure.

Referring now to FIG. 11, shown is a block diagram of a first more specific exemplary system 1100 in accordance with an embodiment of the present disclosure. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 900. In one embodiment of the disclosure, processors 1170 and 1180 are respectively processors 1010 and 1015, while coprocessor 1138 is coprocessor 1045. In another embodiment, processors 1170 and 1180 are respectively processor 1010 coprocessor 1045.

Processors 1170 and 1180 are shown including integrated memory controller (IMC) units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1139. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present disclosure is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
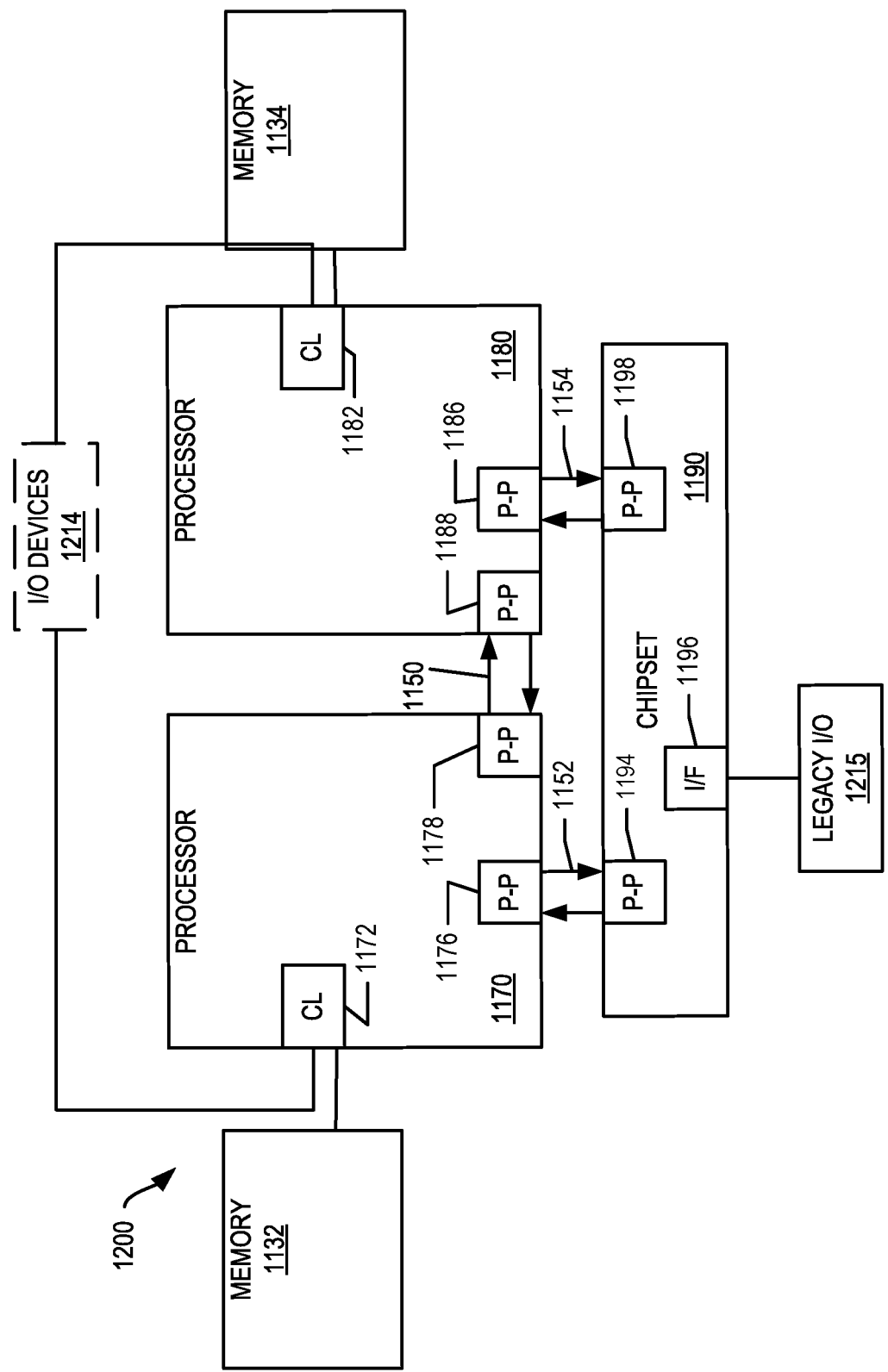
FIG. 12, shown is a block diagram of a second more specific exemplary system in accordance with an embodiment of the present disclosure.

Referring now to FIG. 12, shown is a block diagram of a second more specific exemplary system 1200 in accordance with an embodiment of the present disclosure. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1172 and 1182, respectively. Thus, the CL 1172, 1182 include integrated memory controller units and include I/O control logic. FIG. 12 illustrates that not only are the memories 1132, 1134 coupled to the CL 1172, 1182, but also that I/O devices 1214 are also coupled to the control logic 1172, 1182. Legacy I/O devices 1215 are coupled to the chipset 1190.

Figure 13:
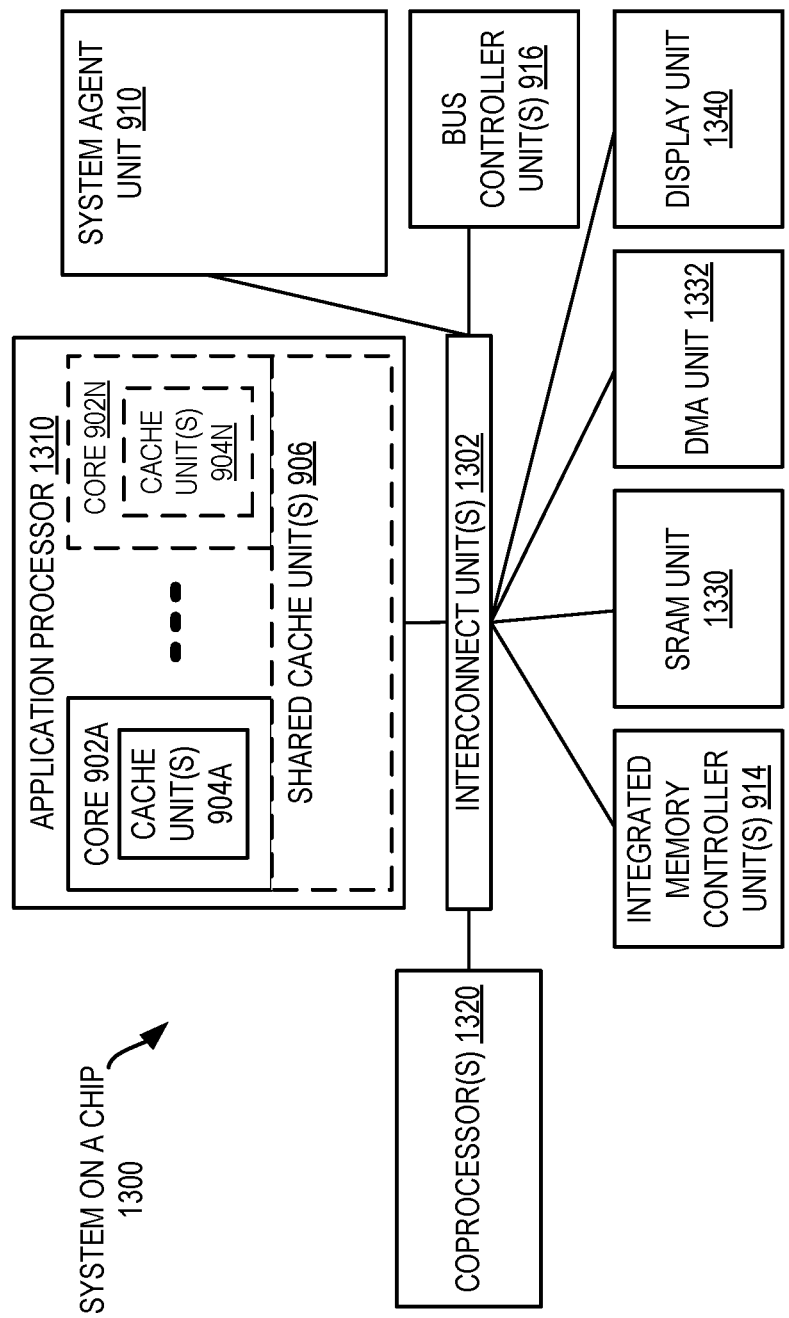
FIG. 13, shown is a block diagram of a system on a chip (SoC) in accordance with an embodiment of the present disclosure.

Referring now to FIG. 13, shown is a block diagram of a SoC 1300 in accordance with an embodiment of the present disclosure. Similar elements in FIG. 9 bear like reference numerals. Also, dashed lined boxes are optional features on more advanced SoCs. In FIG. 13, an interconnect unit(s) 1302 is coupled to: an application processor 1310 which includes a set of one or more cores 202A-N and shared cache unit(s) 906; a system agent unit 910; a bus controller unit(s) 916; an integrated memory controller unit(s) 914; a set or one or more coprocessors 1320 which may include integrated graphics logic, an image processor, an audio processor, and a video processor; an static random access memory (SRAM) unit 1330; a direct memory access (DMA) unit 1332; and a display unit 1340 for coupling to one or more external displays. In one embodiment, the coprocessor(s) 1320 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 14:
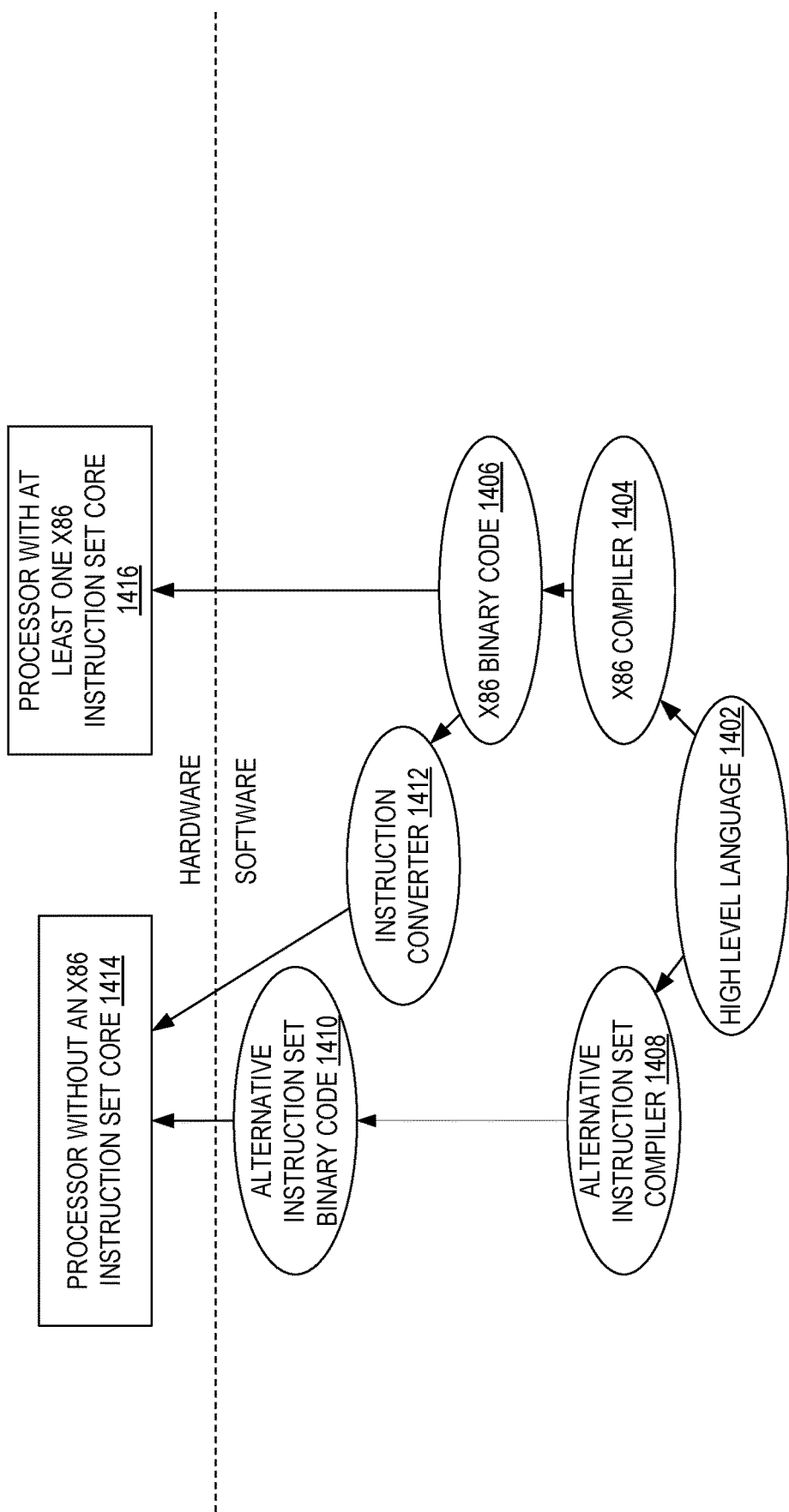
FIG. 14 is a block diagram contrasting the use of a software instruction converter to convert binary instructions in a source instruction set to binary instructions in a target instruction set according to embodiments of the disclosure.

FIG. 14 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 14 shows a program in a high level language 1402 may be compiled using an x86 compiler 1404 to generate x86 binary code 1406 that may be natively executed by a processor with at least one x86 instruction set core 1416. The processor with at least one x86 instruction set core 1416 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 1404 represents a compiler that is operable to generate x86 binary code 1406 (e.g., object code) that can, with or without additional linkage processing, be executed on the processor with at least one x86 instruction set core 1416. Similarly, FIG. 14 shows the program in the high level language 1402 may be compiled using an alternative instruction set compiler 1408 to generate alternative instruction set binary code 1410 that may be natively executed by a processor without at least one x86 instruction set core 1414 (e.g., a processor with cores that execute the MIPS instruction set of MIPS Technologies of Sunnyvale, CA and/or that execute the ARM instruction set of ARM Holdings of Sunnyvale, CA). The instruction converter 1412 is used to convert the x86 binary code 1406 into code that may be natively executed by the processor without an x86 instruction set core 1414. This converted code is not likely to be the same as the alternative instruction set binary code 1410 because an instruction converter capable of this is difficult to make; however, the converted code will accomplish the general operation and be made up of instructions from the alternative instruction set. Thus, the instruction converter 1412 represents software, firmware, hardware, or a combination thereof that, through emulation, simulation or any other process, allows a processor or other electronic device that does not have an x86 instruction set processor or core to execute the x86 binary code 1406.

What is claimed is:

1. A hardware processor comprising:
    a cache to store a plurality of cache lines of data;
    a processing element to generate a memory request and mark the memory request with a reuse hint value; and
    a cache controller circuit to:
        mark a corresponding cache line in the cache as more recently used when the memory request is a read request that is a hit in the cache and the reuse hint value is a first value,
        mark the corresponding cache line in the cache as less recently used when the memory request is the read request that is the hit in the cache and the reuse hint value is a second, different value, and
        when the memory request is a write request that is a miss in the cache and a number of least recently used cache lines in a same cache set does not exceed a threshold value, not fill the cache with a cache line of data for the miss.

2. The hardware processor of claim 1, wherein the cache controller circuit is to, when the memory request is a read request that is a miss in the cache and the reuse hint value is the second, different value, not fill the cache with a cache line of data for the miss.

3. The hardware processor of claim 2, wherein the cache controller circuit is to, when the memory request is the read request that is the miss in the cache and the reuse hint value is the second, different value, send the cache line of data to the processing element.

4. The hardware processor of claim 3, wherein the cache is a last level cache, and the cache line of data is sent to a numerically lower-level cache of the processing element.

5. The hardware processor of claim 2, wherein the cache controller circuit is to, when the memory request is the read request that is the miss in the cache and the reuse hint value is the first value, fill the cache with the cache line of data for the miss.

6. The hardware processor of claim 1, wherein the cache controller circuit is to, when the memory request is the write request that is the miss in the cache and the number of least recently used cache lines in the same cache set exceeds the threshold value, fill the cache with the cache line of data for the miss.

7. The hardware processor of claim 6, wherein the cache controller circuit is to, when the memory request is a write request that is a hit in the cache, fill the cache with a cache line of data for the hit.

8. A method comprising:
    storing a plurality of cache lines of data in a cache of a system;
    generating a memory request with a processing element of the system;
    marking the memory request with a reuse hint value by the system;
    marking, by a cache controller circuit of the system, a corresponding cache line in the cache as more recently used when the memory request is a read request that is a hit in the cache and the reuse hint value is a first value;
    marking, by the cache controller circuit of the system, the corresponding cache line in the cache as less recently used when the memory request is the read request that is the hit in the cache and the reuse hint value is a second, different value; and
    when the memory request is a write request that is a miss in the cache and a number of least recently used cache lines in a same cache set does not exceed a threshold value, not filling the cache with a cache line of data for the miss by the cache controller circuit.

9. The method of claim 8, further comprising, when the memory request is a read request that is a miss in the cache and the reuse hint value is the second, different value, not filling the cache with a cache line of data for the miss by the cache controller circuit.

10. The method of claim 9, further comprising, when the memory request is the read request that is the miss in the cache and the reuse hint value is the second, different value, sending the cache line of data to the processing element.

11. The method of claim 10, wherein the cache is a last level cache, and the sending of the cache line of data is to a numerically lower-level cache of the processing element.

12. The method of claim 9, further comprising, when the memory request is the read request that is the miss in the cache and the reuse hint value is the first value, filling the cache with the cache line of data for the miss by the cache controller circuit.

13. The method of claim 8, further comprising, when the memory request is the write request that is the miss in the cache and the number of least recently used cache lines in the same cache set exceeds the threshold value, filling the cache with the cache line of data for the miss by the cache controller circuit.

14. The method of claim 13, further comprising, when the memory request is a write request that is a hit in the cache, filling the cache with a cache line of data for the hit.

15. A system comprising:
a hardware processor comprising:
   a cache to store a plurality of cache lines of data, and
   a processing element to generate a memory request and mark the memory request with a reuse hint value;
a memory coupled to the hardware processor; and
a cache controller circuit to:
   mark a corresponding cache line in the cache as more recently used when the memory request is a read request that is a hit in the cache and the reuse hint value is a first value,
   mark the corresponding cache line in the cache as less recently used when the memory request is the read request that is the hit in the cache and the reuse hint value is a second, different value, and
   when the memory request is a write request that is a miss in the cache and a number of least recently used cache lines in a same cache set does not exceed a threshold value, not fill the cache with a cache line of data for the miss.

16. The system of claim 15, wherein the cache controller circuit is to, when the memory request is a read request that is a miss in the cache and the reuse hint value is the second, different value, not fill the cache with a cache line of data for the miss.

17. The system of claim 16, wherein the cache controller circuit is to, when the memory request is the read request that is the miss in the cache and the reuse hint value is the second, different value, send the cache line of data to the processing element from the memory.

18. The system of claim 17, wherein the cache is a last level cache, and the cache line of data is sent to a numerically lower-level cache of the processing element.

19. The system of claim 16, wherein the cache controller circuit is to, when the memory request is the read request that is the miss in the cache and the reuse hint value is the first value, fill the cache with the cache line of data for the miss from the memory.

20. The system of claim 15, wherein the cache controller circuit is to, when the memory request is the write request that is the miss in the cache and the number of least recently used cache lines in the same cache set exceeds the threshold value, fill the cache with the cache line of data for the miss.

21. The system of claim 20, wherein the cache controller circuit is to, when the memory request is a write request that is a hit in the cache, fill the cache with a cache line of data for the hit from the memory.

* * * * *